United States Patent
Karam

(10) Patent No.: US 8,149,683 B2
(45) Date of Patent: Apr. 3, 2012

(54) FAIL-SAFE INLINE POWER IN A WIRED DATA TELECOMMUNICATIONS NETWORK

(75) Inventor: Roger A. Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 996 days.

(21) Appl. No.: 11/133,012

(22) Filed: May 18, 2005

(65) Prior Publication Data

US 2006/0262713 A1 Nov. 23, 2006

(51) Int. Cl.
*H04L 5/20* (2006.01)
*G06F 1/00* (2006.01)

(52) U.S. Cl. ........................................ 370/200; 713/340
(58) Field of Classification Search .................... 370/200
See application file for complete search history.

(56) References Cited

U.S. PATENT DOCUMENTS

| | | | |
|---|---|---|---|
| 3,631,534 A * | 12/1971 | Hirota et al. .................. | 336/155 |
| 4,835,737 A | 5/1989 | Herrig et al. | |
| 4,970,623 A * | 11/1990 | Pintar ............................ | 361/187 |
| 5,122,691 A | 6/1992 | Balakrishnan | |
| 5,237,511 A | 8/1993 | Caird et al. | |
| 5,264,833 A * | 11/1993 | Jeffers et al. .................. | 340/632 |
| 5,268,592 A | 12/1993 | Bellamy et al. | |
| 5,289,359 A | 2/1994 | Ziermann | |
| 5,386,567 A | 1/1995 | Lien et al. | |
| 5,406,260 A | 4/1995 | Cummings et al. | |
| 5,461,671 A | 10/1995 | Sakuragi et al. | |
| 5,483,574 A | 1/1996 | Yuyama | |
| 5,491,804 A | 2/1996 | Heath et al. | |
| 5,531,612 A | 7/1996 | Goodall et al. | |
| 5,608,792 A | 3/1997 | Laidler | |
| 5,613,130 A | 3/1997 | Teng et al. | |
| 5,639,267 A | 6/1997 | Loudermilk | |
| 5,726,506 A | 3/1998 | Wood | |
| 5,742,513 A | 4/1998 | Bouhenguel et al. | |
| 5,758,102 A | 5/1998 | Carey et al. | |
| 5,775,946 A | 7/1998 | Briones | |
| 5,790,391 A | 8/1998 | Stich et al. | |
| 5,790,873 A | 8/1998 | Popper et al. | |
| 5,793,987 A | 8/1998 | Quackenbush et al. | |

(Continued)

FOREIGN PATENT DOCUMENTS

WO 00/41496 7/2000

OTHER PUBLICATIONS

Berger, A. et al., "Power Ethernet MIB", IETF Standard, Internet Engineering Task Force, pp. 1-20, Dec. 2003.

(Continued)

*Primary Examiner* — John Blanton
(74) *Attorney, Agent, or Firm* — BainwoodHuang

(57) ABSTRACT

A dynamic fuse element is provided in an inline power circuit to provide an electrical current protection level that varies in accordance with allocated current levels and that can respond to current spikes that are not expected. The dynamic fuse element comprises a processor aware of allocated current levels and an inline switch controlled by the processor to turn OFF in the event of a fault. In another aspect ferrite fuses may be provided for relatively low-current applications. In yet another aspect test fuses may be placed on the circuit board to verify that fuses used in manufacture operate at a certain current level.

27 Claims, 12 Drawing Sheets

U.S. PATENT DOCUMENTS

| | | | |
|---|---|---|---|
| 5,796,185 | A | 8/1998 | Takata et al. |
| 5,809,256 | A | 9/1998 | Najemy |
| 5,834,925 | A | 11/1998 | Chesavage |
| 5,884,233 | A | 3/1999 | Brown |
| 5,991,885 | A | 11/1999 | Chang et al. |
| 5,994,998 | A | 11/1999 | Fisher et al. |
| 6,033,266 | A | 3/2000 | Long |
| 6,036,547 | A | 3/2000 | Belopolsky et al. |
| 6,059,581 | A | 5/2000 | Wu |
| 6,068,520 | A | 5/2000 | Winings et al. |
| 6,099,349 | A | 8/2000 | Boutros |
| 6,115,468 | A | 9/2000 | De Nicolo |
| 6,134,666 | A | 10/2000 | De Nicolo |
| 6,162,089 | A | 12/2000 | Costello et al. |
| 6,218,930 | B1 | 4/2001 | Katzenberg et al. |
| 6,233,128 | B1 | 5/2001 | Spencer et al. |
| 6,275,958 | B1 * | 8/2001 | Carpenter et al. ............. 714/48 |
| 6,310,781 | B1 | 10/2001 | Karam |
| 6,396,392 | B1 | 5/2002 | Abraham |
| 6,496,103 | B1 | 12/2002 | Weiss et al. |
| 6,496,105 | B2 | 12/2002 | Fisher et al. |
| 6,528,904 | B1 * | 3/2003 | Wong ............................ 307/140 |
| 6,541,878 | B1 | 4/2003 | Diab |
| 6,701,443 | B1 | 3/2004 | Bell |
| 6,762,675 | B1 | 7/2004 | Cafiero et al. |
| 6,804,351 | B1 | 10/2004 | Karam |
| 7,251,570 | B2 * | 7/2007 | Hancock et al. ................ 702/57 |
| 7,254,734 | B2 * | 8/2007 | Lehr et al. ..................... 713/340 |
| 2003/0052771 | A1 * | 3/2003 | Enders et al. ............ 340/310.01 |
| 2004/0230846 | A1 | 11/2004 | Mancey et al. |
| 2005/0044431 | A1 * | 2/2005 | Lang et al. .................... 713/300 |
| 2005/0105542 | A1 * | 5/2005 | Seki et al. ..................... 370/402 |
| 2005/0128671 | A1 * | 6/2005 | Miyamoto ..................... 361/118 |
| 2005/0146827 | A1 * | 7/2005 | Borden et al. ................. 361/118 |
| 2006/0156054 | A1 * | 7/2006 | Brown et al. ..................... 714/4 |
| 2006/0230299 | A1 * | 10/2006 | Zaretsky et al. .............. 713/320 |

OTHER PUBLICATIONS

IEEE Std 802.3af™—2003 (Amendment to IEEE Std 802.3™—2002, including IEEE Std 802.3ae™—2002), Part 3: Carrier Sense Multiple Access with Collision Detection (CSMA/CD) Access Method and Physical Layer Specifications, Amendment: Data Terminal Equipment (DTE) Power via Media Dependent Interface (MDI), IEEE The Institute of Electrical and Electronics Engineers, Inc., Approved Jun. 12, 2003.

International Search Report for International Application No. PCT/US2006/019127, date of mailing Jan. 9, 2007.

Invitation to Pay Additional Fees (Partial International Search), Application No. PCT/US2006/019127, date of mailing Oct. 6, 2006.

Linear Technology, "LTC4259A Quad IEEE 802.3af Power over Ethernet Controller with AC Disconnect", Datasheet, XP-002400054, pp. 1-32, http://www.ortodoxism.ro/datasheets/lineartechnology/4259af.pdf, 2003.

Mendelson, G., White Paper "All You Need to Know About Power Over Ethernet (PoE) and the IEEE 802.3af Standard", pp. 1-24, Jun. 2004.

Murata Manufacturing Co., Ltd., "On-Board Type (DC) EMI Suppression Filters (EMIFIL®)", Cat.No. C31E-12, pp. 0-72, Aug. 30, 2004.

"IEEE Standard 802.3af™", IEEE Standard for Information Technology—Telecommunications and Information Exchange Between Systems—Local and Metropolitan Area Networks-Specific Requirement, IEEE The Institute of Electrical and Electronics Engineering, Inc., Jun. 18, 2003.

"3Com® NJ100 Network Jack Power", printed from http://www.poweroverethernet.com/manual/content/view/full/776/, 3Com, Tuesday, Mar. 18, 2003.

3Com User Guide—3Com IntelliJack, Model NJ220, Version 1.0, 3Com, Nov. 2003.

* cited by examiner

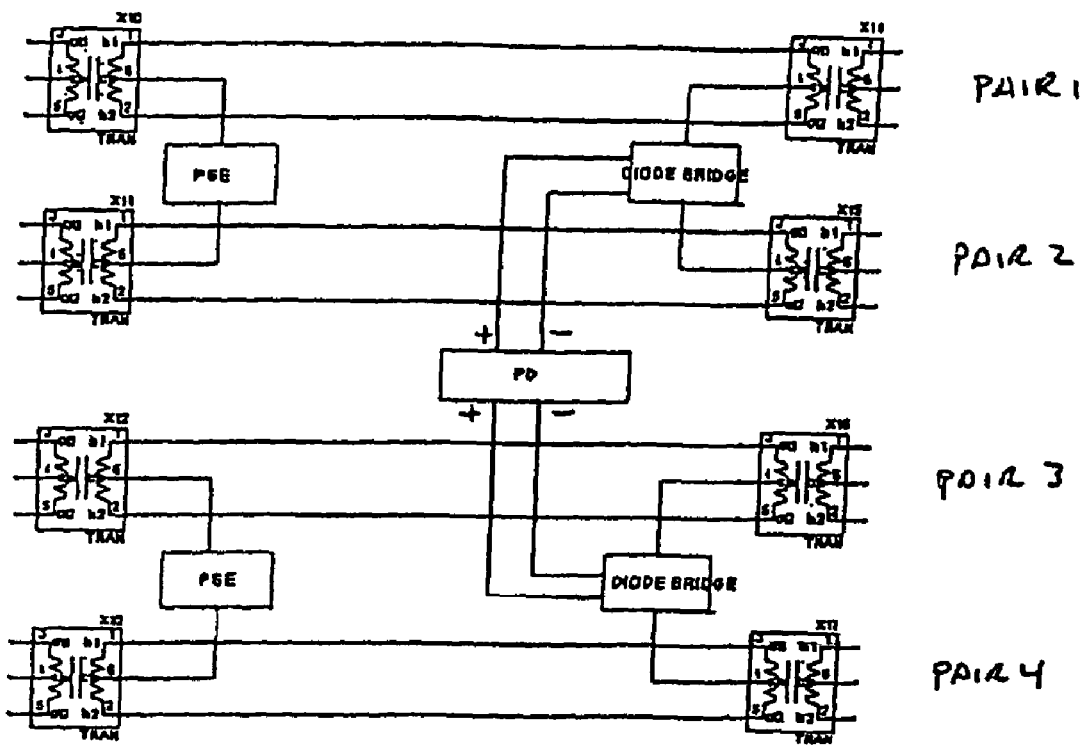
FIG. 1D
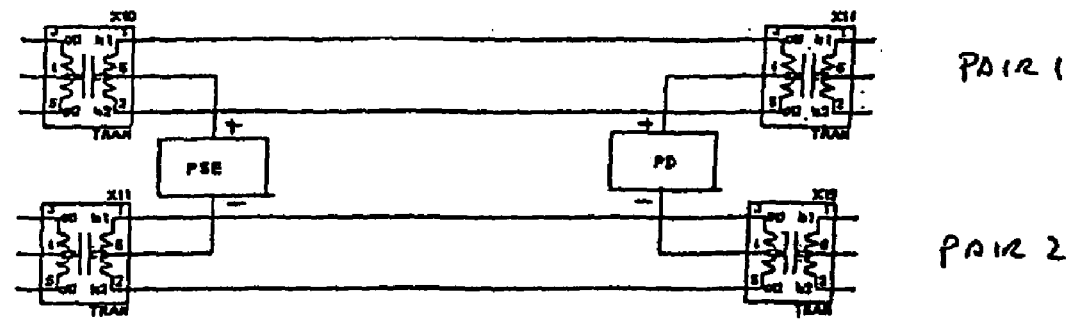
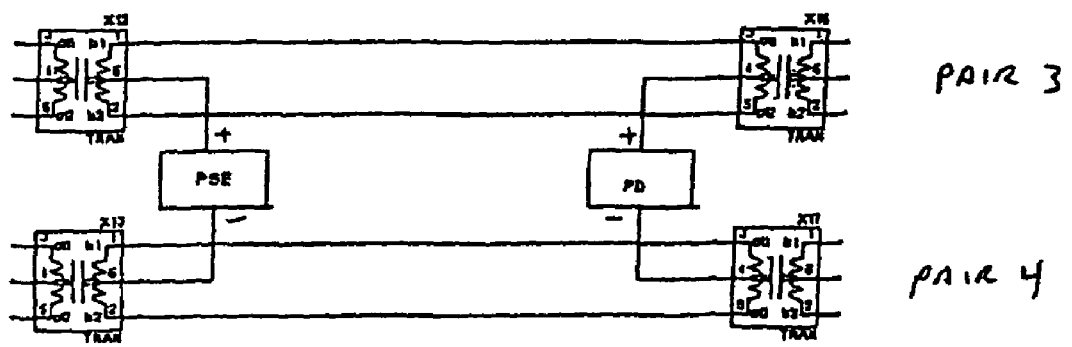
FIG. 1E

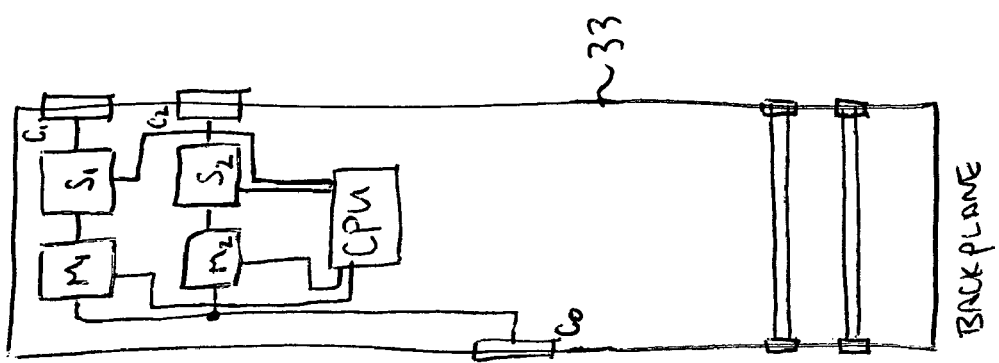

PROVIDING INLINE POWER FROM A POWER SUPPLY TO AN INDIVIDUAL INLINE POWER SUPPLY CIRCUIT POWERING A PORT OF A WIRED DATA TELECOMMUNICATIONS DEVICE ~110

DISPOSING BETWEEN THE POWER SUPPLY AND THE INDIVIDUAL INLINE POWER SUPPLY CIRCUIT ONE OR MORE FERRITE DEVICES SELECTED TO HAVE A COMBINED MAXIMUM CURRENT RATING APPROXIMATELY THAT OF A DESIRED CURRENT LIMIT OF THE INDIVIDUAL INLINE POWER SUPPLY CIRCUIT ~112

FIG. 8

FAIL-SAFE INLINE POWER IN A WIRED DATA TELECOMMUNICATIONS NETWORK

STATEMENT OF RELATED CASES

This patent may be considered to be related to commonly owned U.S. patent application Ser. No. 10/961,865 filed on Oct. 7, 2004 and entitled "Automatic System for Power and Data Redundancy in a Wired Data Telecommunications Network" in the names of inventors Roger A. Karam and Luca Cafiero. That application is hereby incorporated herein by reference as if set forth fully herein.

This patent may also be considered to be related to commonly owned U.S. patent application Ser. No. 11/022,266 filed on Dec. 23, 2004 and entitled "Redundant Power and Data In A Wired Data Telecommunications Network" in the names of inventors Roger A. Karam and Luca Cafiero.

This patent may also be considered to be related to commonly owned U.S. patent application Ser. No. 11/000,734 filed on Nov. 30, 2004 and entitled "Power and Data Redundancy in a Single Wiring Closet" in the names of inventors Roger A. Karam and Luca Cafiero. That application is hereby incorporated herein by reference as if set forth fully herein.

This patent may be considered to be related to commonly owned U.S. patent application Ser. No. 10/961,864 filed on Oct. 7, 2004 and entitled "Bidirectional Inline Power Port" in the names of inventors Daniel Biederman, Kenneth Coley and Frederick R. Schindler.

This patent may also be considered to be related to commonly owned U.S. patent application Ser. No. 10/961,243 filed on Oct. 7, 2004 and entitled "Redundant Power and Data Over A Wired Data Telecommunications Network" in the names of inventors Daniel Biederman, Kenneth Coley and Frederick R. Schindler.

This patent may also be considered to be related to commonly owned U.S. patent application Ser. No. 10/961,904 filed on Oct. 7, 2004 and entitled "Inline Power-Based Common Mode Communications in a Wired Data Telecommunications Network" in the names of inventors Roger A. Karam, Frederick R. Schindler and Wael William Diab.

This patent may also be considered to be related to commonly owned U.S. patent application Ser. No. 10/982,383 filed on Nov. 5, 2004 and entitled "Power Management for Serial-Powered Device Connections" in the name of inventor Roger A. Karam.

This patent may also be considered to be related to commonly owned U.S. patent application Ser. No. 10/981,203 filed on Nov. 3, 2004 and entitled "Powered Device Classification In A Wired Data Telecommunications Network" in the name of inventors Roger A. Karam and John F. Wakerly.

This patent may also be considered to be related to commonly owned U.S. patent application Ser. No. 10/981,202 filed on Nov. 3, 2004 and entitled "Current Imbalance Compensation for Magnetics in a Wired Data Telecommunications Network" in the names of inventors Roger A. Karam and John F. Wakerly.

This patent may also be considered to be related to commonly owned U.S. patent application Ser. No. 10/845,021 filed May 13, 2004 and entitled "Improved Power Delivery over Ethernet Cable" in the names of inventors Wael William Diab and Frederick R. Schindler.

This patent may also be considered to be related to commonly owned U.S. Pat. No. 6,541,878 entitled "Integrated RJ-45 Magnetics with Phantom Power Provision" in the name of inventor Wael William Diab.

This patent may also be considered to be related to commonly owned U.S. patent application Ser. No. 10/850,205 filed May 20, 2004 and entitled "Methods and Apparatus for Provisioning Phantom Power to Remote Devices" in the name of inventors Wael William Diab and Frederick R. Schindler.

FIELD OF THE INVENTION

The present invention relates generally to networking equipment which is powered by and/or powers other networking equipment over wired data telecommunications network connections.

BACKGROUND OF THE INVENTION

Inline power (also known as Power over Ethernet and PoE) is a technology for providing electrical power over a wired telecommunications network from power source equipment (PSE) to a powered device (PD) over a link section. The power may be injected by an endpoint PSE at one end of the link section or by a midspan PSE along a midspan of a link section that is distinctly separate from and between the medium dependent interfaces (MDIs) to which the ends of the link section are electrically and physically coupled.

PoE is defined in the IEEE (The Institute of Electrical and Electronics Engineers, Inc.) Standard Std 802.3af-2003 published 18 Jun. 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 820.3af standard is a globally applicable standard for combining the transmission of Ethernet packets with the transmission of DC-based power over the same set of wires in a single Ethernet cable. It is contemplated that Inline power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, 48 Volt power available at a range of power levels from roughly 0.5 watt to about 15.4 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RG-45 connectors (male or female, as appropriate) are typically used on both ends of all Ethernet connections. They are wired as defined in the IEEE 802.3af standard. Two conductor wiring such as shielded or unshielded twisted pair wiring (or coaxial cable or other conventional network cabling) may be used so each transmitter and receiver has a pair of conductors associated with it.

FIGS. 1A, 1B and IC are electrical schematic diagrams of three different variants of PoE as contemplated by the IEEE 802.3af standard. In FIG. 1A a data telecommunications network 10*a* comprises a switch or hub 12*a* with integral power sourcing equipment (PSE) 14*a*. Power from the PSE 14*a* is injected on the two data carrying Ethernet twisted pairs 16*aa* and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from center-tapped transformers 20aa and 20ab to powered device (PD) 22a for use thereby as shown. In FIG. 1B a data telecommunications network 10b comprises a switch or hub 12b with integral power sourcing equipment (PSE) 14b. Power from the PSE 14b is injected on the two non-data carrying Ethernet twisted pairs 16bc and 16bd. Data carrying Ethernet twisted pairs 16ba and 16bb are unused in this variant for power transfer. The power from non-data carrying Ethernet twisted pairs 16bc and 16bd is conducted to powered device (PD) 22b for use thereby as shown. In FIG. 1C a data telecommunications network 10c comprises a switch or hub 12c without integral power sourcing equipment (PSE). Midspan power insertion equipment 24 simply passes the data signals on the two data carrying Ethernet twisted pairs 16ca-1 and 16cb-1 to corresponding data carrying Ethernet twisted pairs 16ca-2 and 16cb-2. Power from the PSE 14c located in the Midspan power insertion equipment 24 is injected on the two non-data carrying Ethernet twisted pairs 16cc-2 and 16cd-2 as shown. The power from non-data carrying Ethernet twisted pairs 16cc-2 and 16cd-2 is conducted to powered device (PD) 22c for use thereby as shown. Note that powered end stations 26a, 26b and 26c are all the same so that they can achieve compatibility with each of the previously described variants.

Turning now to FIGS. 1D and 1E, electrical schematic diagrams illustrate variants of the IEEE 802.3af standard in which 1000 Base T communication is enabled over a four pair Ethernet cable. Inline power may be supplied over two pair or four pair. In FIG. 1D the PD accepts power from a pair of diode bridge circuits such as full wave diode bridge rectifier type circuits well known to those of ordinary skill in the art. Power may come from either one or both of the diode bridge circuits, depending upon whether inline power is delivered over Pair 1-2, Pair 3-4 or Pair 1-2+Pair 3-4. In the circuit shown in FIG. 1E a PD associated with Pair 1-2 is powered by inline power over Pair 1-2 and a PD associated with Pair 3-4 is similarly powered. The approach used will depend upon the PD to be powered. In accordance with both of these versions, bidirectional full duplex communication may be carried out over each data pair, if desired.

Inline power is also available through techniques that are non-IEEE 802.3 standard compliant as is well known to those of ordinary skill in the art.

In order to provide regular inline power to a PD from a PSE it is a general requirement that two processes first be accomplished. First, a "discovery" process must be accomplished to verify that the candidate PD is, in fact, adapted to receive inline power. Second, a "classification" process must be accomplished to determine an amount of inline power to allocate to the PD, the PSE having a finite amount of inline power resources available for allocation to coupled PDs.

The discovery process looks for an "identity network" at the PD. The identity network is one or more electrical components which respond in certain predetermined ways when probed by a signal from the PSE. One of the simplest identity networks is a resistor coupled across the two pairs of common mode power/data conductors. The IEEE 802.3af standard calls for a 25,000 ohm resistor to be presented for discovery by the PD. The resistor may be present at all times or it may be switched into the circuit during the discovery process in response to discovery signals from the PSE.

The PSE applies some inline power (not "regular" inline power, i.e., reduced voltage and limited current) as the discovery signal to measure resistance across the two pairs of conductors to determine if the 25,000 ohm identity network is present. This is typically implemented as a first voltage for a first period of time and a second voltage for a second period of time, both voltages exceeding a maximum idle voltage (0-5 VDC in accordance with the IEEE 802.3af standard) which may be present on the pair of conductors during an "idle" time while regular inline power is not provided. The discovery signals do not enter a classification voltage range (typically about 15-20V in accordance with the IEEE 802.3af standard) but have a voltage between that range and the idle voltage range. The return currents responsive to application of the discovery signals are measured and a resistance across the two pairs of conductors is calculated. If that resistance is the identity network resistance, then the classification process may commence, otherwise the system returns to an idle condition.

In accordance with the IEEE 802.3af standard, the classification process involves applying a voltage in a classification range to the PD. The PD may use a current source to send a predetermined classification current signal back to the PSE. This classification current signal corresponds to the "class" of the PD. In the IEEE 802.3af standard as presently constituted, the classes are as set forth in Table I:

TABLE I

| Class | PSE Classification Current Range (mA) | Corresponding Inline Power Level (W) |
|---|---|---|
| 0 | 0-5 | 15.4 |
| 1 | 8-13 | 4.0 |
| 2 | 16-21 | 7.0 |
| 3 | 25-31 | 15.4 |
| 4 | 35-45 | 15.4 |

The discovery process is therefore used in order to avoid providing inline power (at full voltage of −48 VDC) to so-called "legacy" devices which are not particularly adapted to receive or utilize inline power.

The classification process is therefore used in order to manage inline power resources so that available power resources can be efficiently allocated and utilized.

At present, conventional inline fuses (resettable or non-resettable fusible links) are generally used to protect circuitry from faults which would cause over-current conditions. Such devices are typically designed to fault or "blow" at a certain absolute current value. They often require a certain amount of time to blow once that certain absolute current level has been reached or exceeded. This time delay can pose problems under certain circumstances. They also operate at fixed current thresholds which can, under certain circumstances, be a disadvantage.

Accordingly, it would be desirable to provide a more intelligent form of current protection to circuits.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIGS. 5, 6, 7, 8 and 9 are process flow diagrams illustrating methods in accordance with various embodiments of the present invention.

DETAILED DESCRIPTION

Embodiments of the present invention described in the following detailed description are directed at fail-safe inline power in a wired data telecommunications network. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Data communications networks have become an integral part of everyday life for many people. As important and even critical applications are carried out over such networks, the ability to provide very high reliability to such networks becomes more and more important. Some such applications now include voice over internet protocol (VOIP) telephone communications, email, computer connectivity and the like. In wired data telecommunications networks, such as well-known Ethernet networks, connectivity is provided by cables containing wire conductors. End user terminals (telephones, PDAs, laptop or desktop computers, and the like), when connected by wires (as opposed to wirelessly) are normally coupled to a switch or router by a single Ethernet cable, or via an Ethernet cable to a wall jack, which is, in turn, coupled to a switch or router via a single cable. The switches and routers are frequently connected among themselves by single Ethernet cables.

Figure 1A:
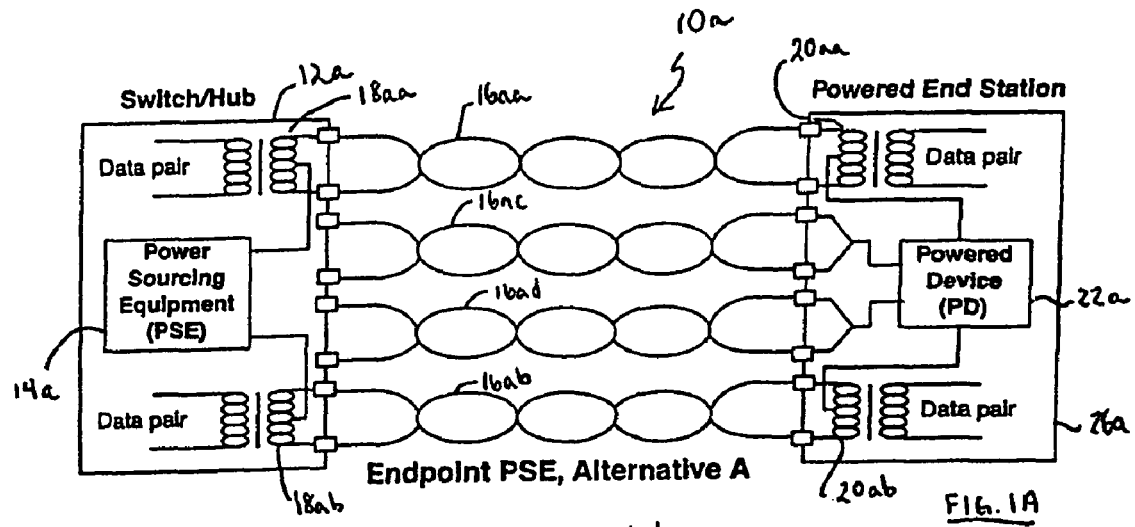
FIGS. 1A, 1B, 1C, 1D and 1E are electrical schematic diagrams of portions of data telecommunications networks in accordance with the prior art.
Figure 1B:
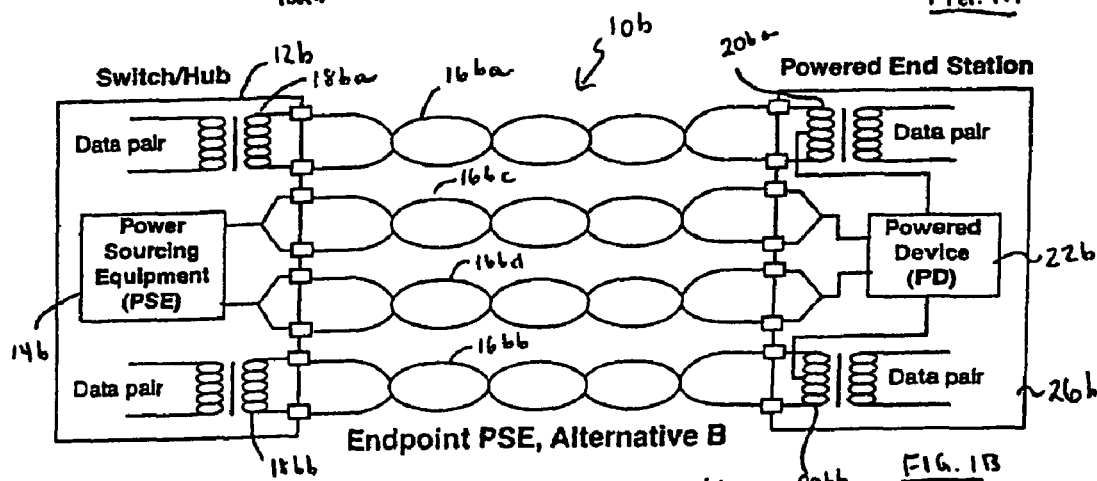
Figure 1C:
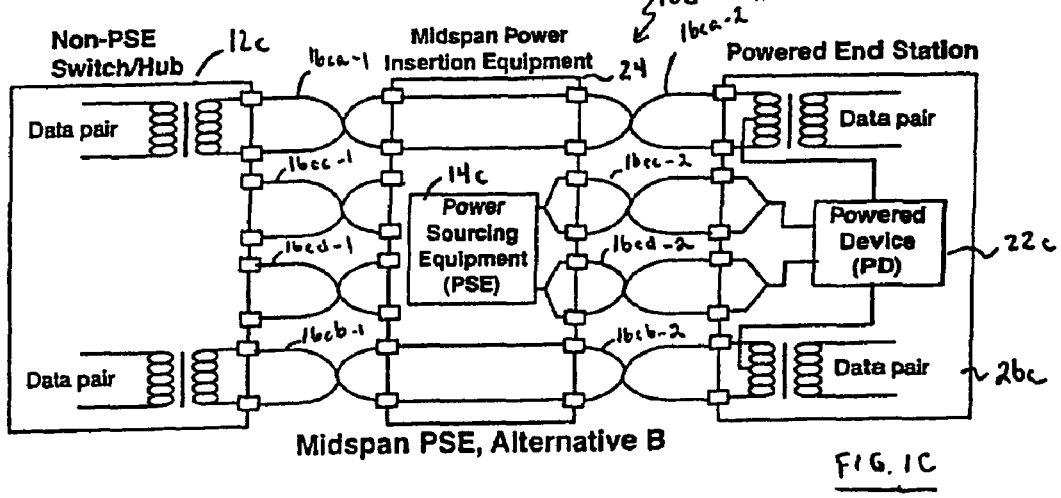
Figure 2A:
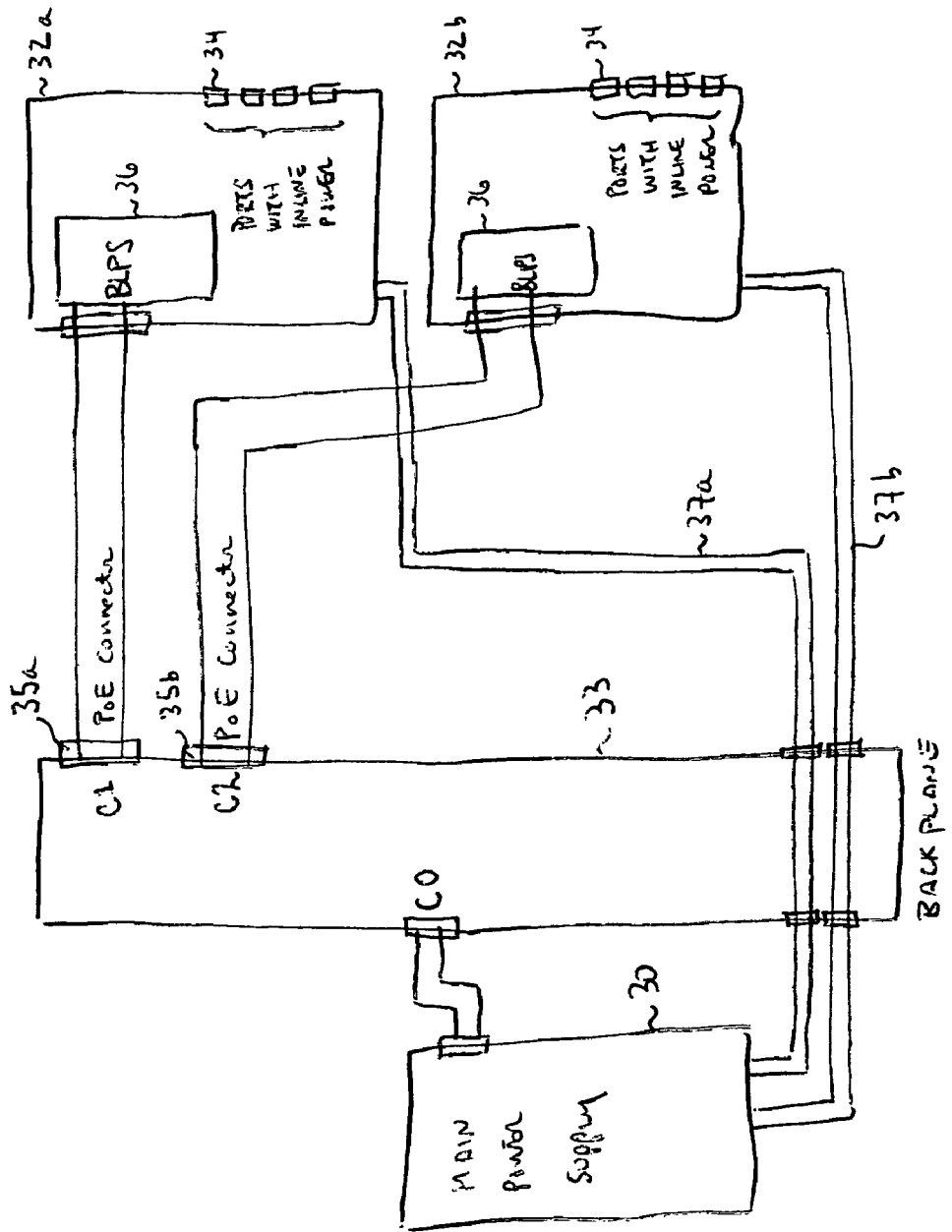
FIGS. 2A and 2B are a block diagram of a wired data telecommunications device configured to provide inline power to devices attached to its various ports.
Figure 2A:
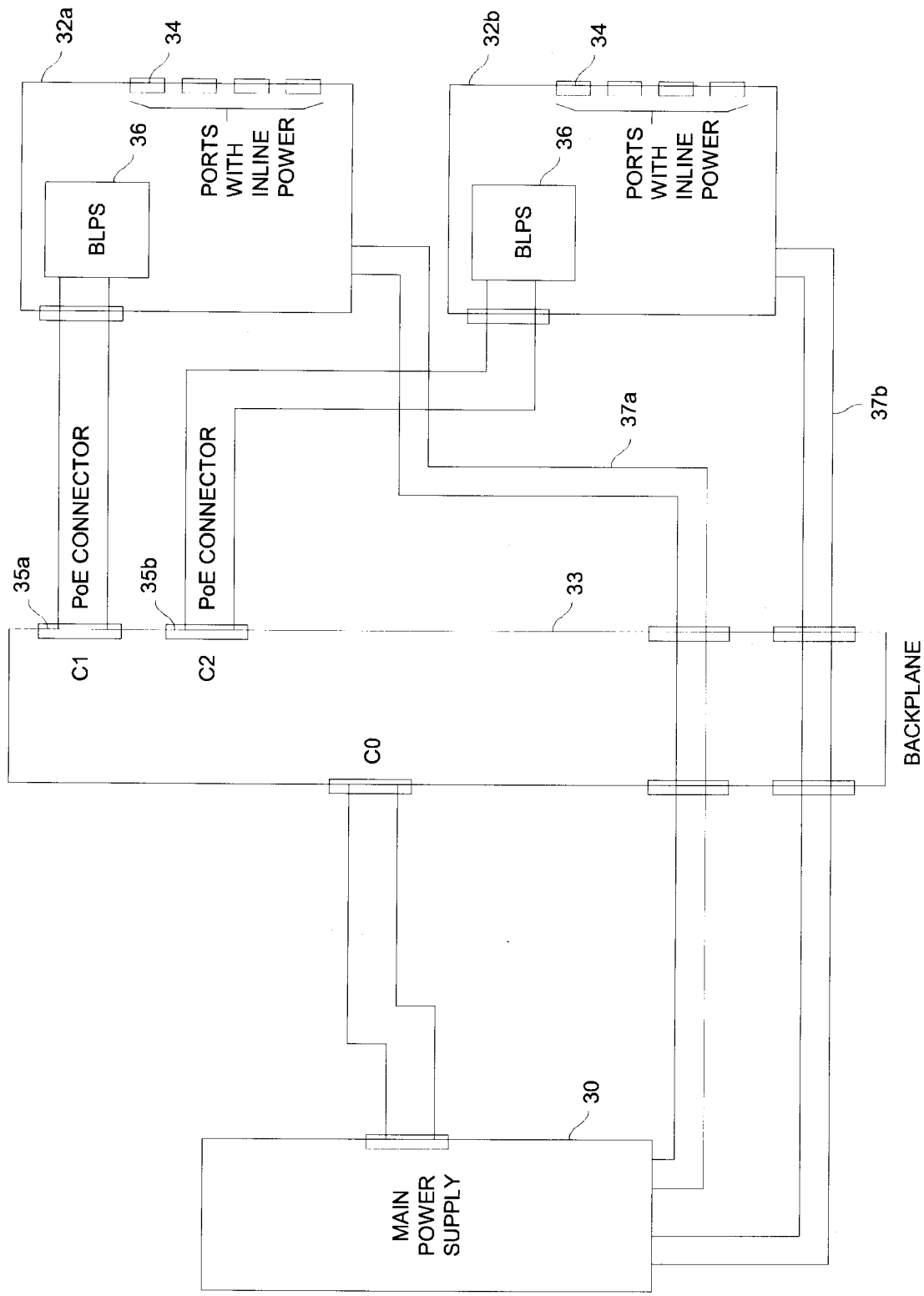
Figure 2B:
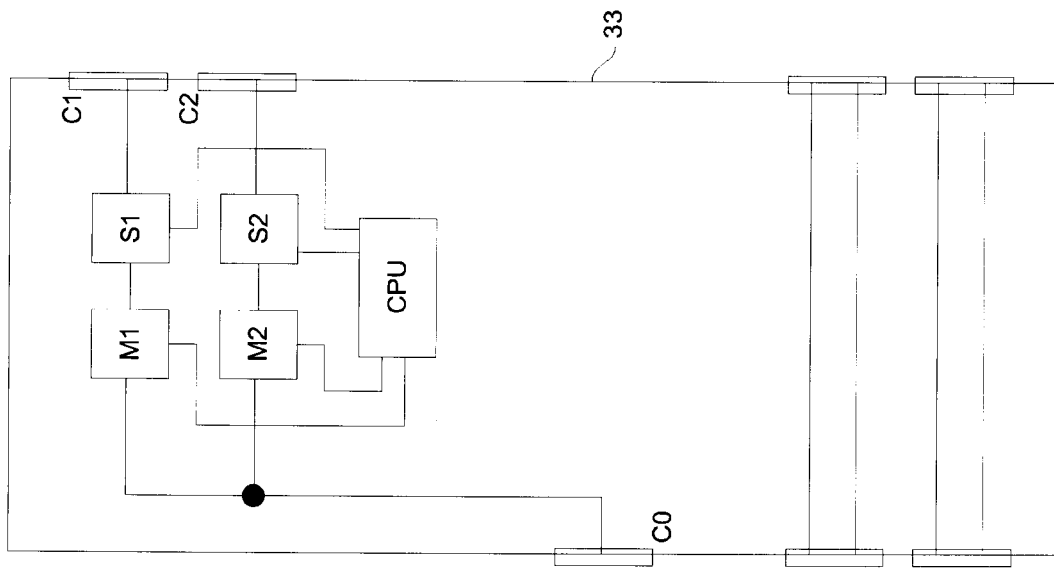
Figure 3:
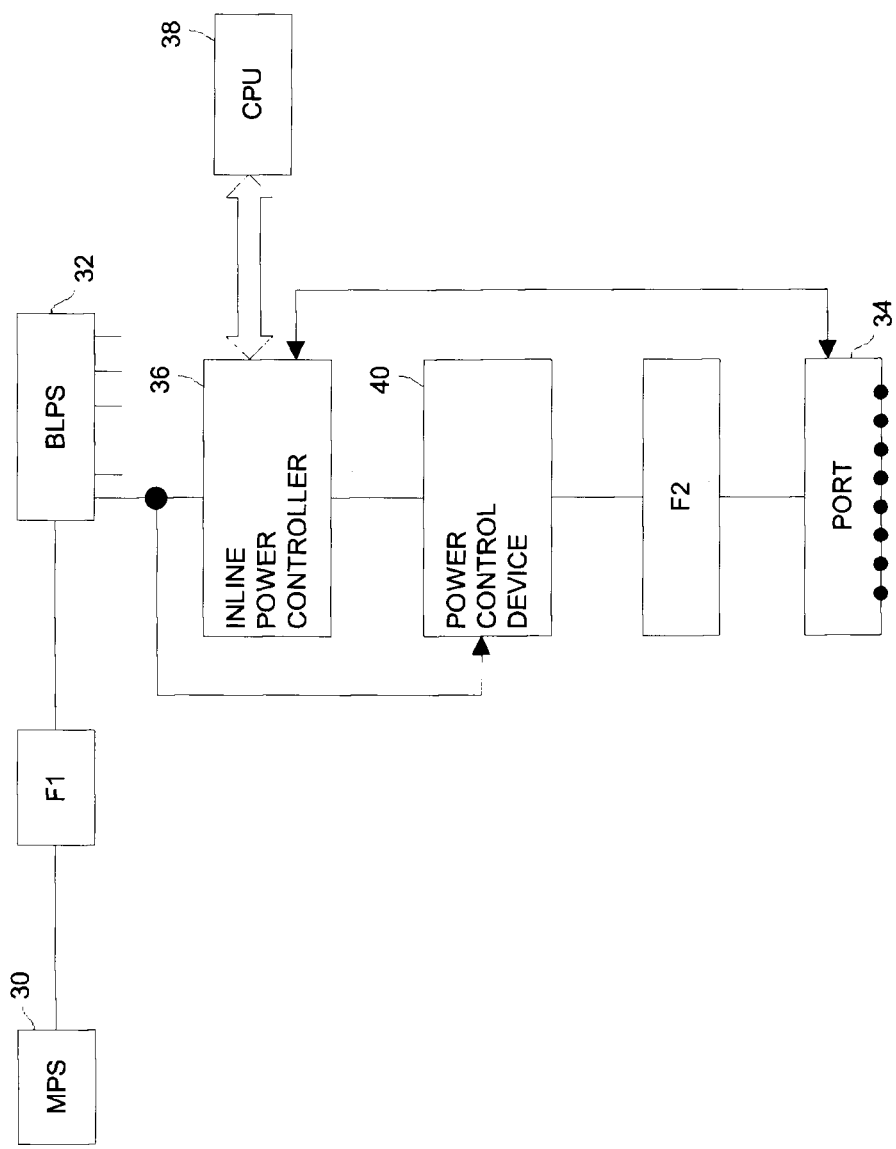

In modern data telecommunications equipment equipped for the delivery of inline power to attached devices as illustrated in block form in FIGS. 2A and 2B, a main power supply 30 provides inline power for distribution to one or more boards or "blades" 32a, 32b over a backplane 33 (FIG. 2B) and through connectors C0 (input to the backplane 33) and connectors C1/35a and C2/35b (outputs from the backplane 33). Each such board or blade 32a, 32b has associated with it a number of wired data telecommunications network ports 34 (such as conventional Ethernet ports with female RG-45 connectors, RJ-21 connectors, or the like). The ports 34 are coupled to main power supply 30, often via one or more board level power supplies 36 which obtain their power, in turn, from main power supply 30. It is not required that an individual board have a board level power supply 36 comprising, for example, a DC/DC converter or similar circuitry, and where such is the case, the board level power supply 36 may be thought of as simply an electrical coupling to the main power supply 30.

Communications channels 37a, 37b may be implemented where desired to couple boards 32a and 32b, respectively, through backplane 33 to main power supply 30 in order to provide management, status and control signaling as well known to those of ordinary skill in the art. The main power supply 30 may be configured to deliver one or more different voltage potentials, e.g., 3.3 VDC, 12 VDC and 400 VDC as required by the specific application. The concepts of the present invention may be applied in a number of ways, as desired, for example, each voltage potential supplied may be protected separately or the power may be combined for monitoring among different values supplied.

Figure 3:
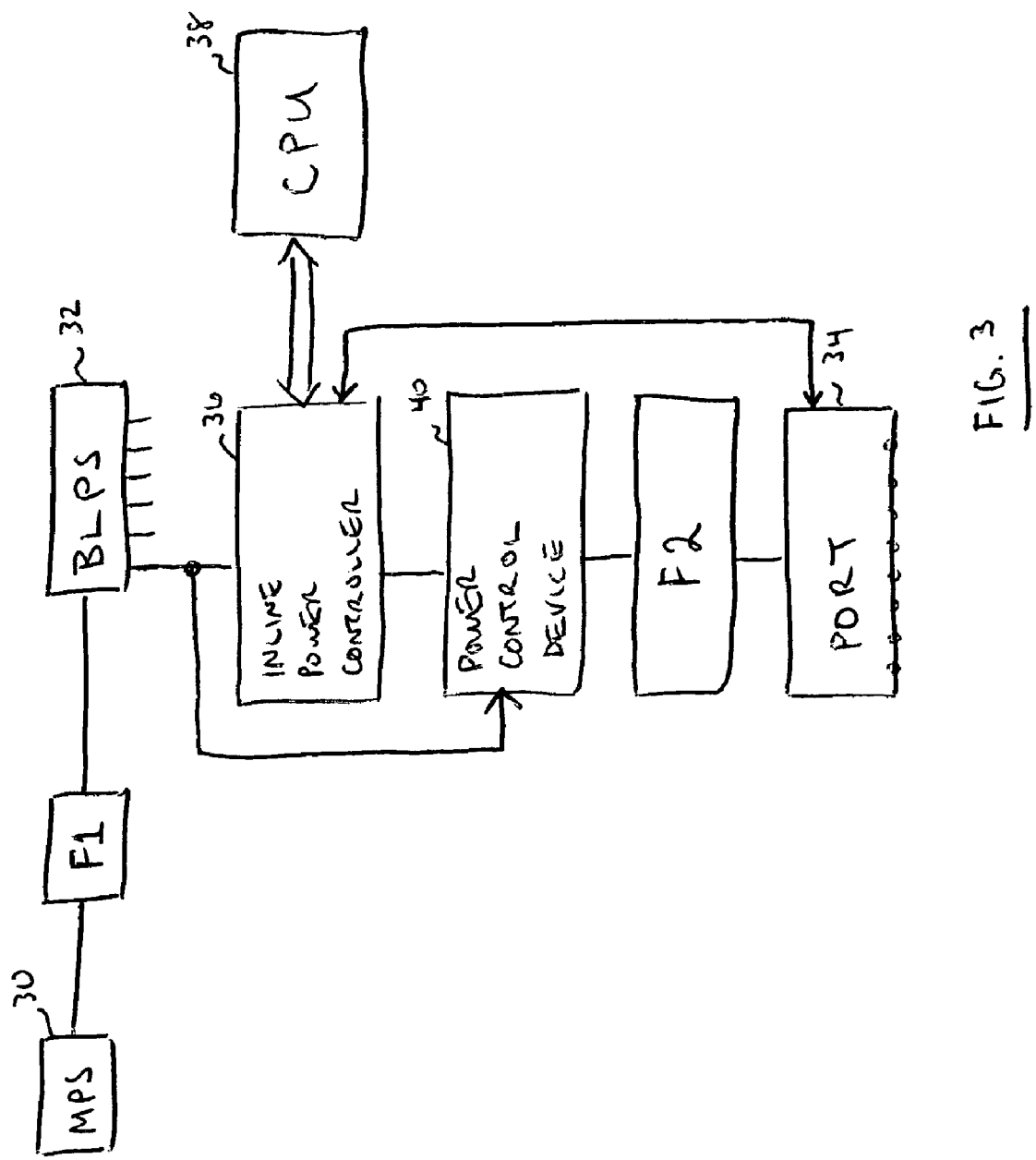
FIG. 3 is an electrical schematic diagram in block form of the wired data telecommunications device of FIGS. 2A and 2B.

Turning now to FIG. 3, such a system is shown in somewhat more detail. Board level power supply (BLPS) 32 is typically protected by a fuse (a conventional fusible link or a resettable fuse) F1 coupling it to main power supply 30. One or more inline power controllers 36 (usually implemented as integrated circuits) is coupled to receive power from the BLPS 32 and to operate under the control of a processor (CPU) 38. Inline power controller 36 controls a power control device 40 (which may be a MOSFET (metal oxide semiconductor field effect transistor) or any other device for controlling and limiting current sourced from BLPS 32 and provided to port 34 via local port fuse F2 (which also may be a fusible link or a resettable fuse. The inline power controller 36 establishes required levels of inline power to be supplied to port 34, measures the DC (direct current) current drawn on each port that it controls and can supply the CPU 38 with such data in real time or periodically at some frequency. The CPU 38 may read the settings inside the inline power controller 36 and update the power drawn on each port, thus determining the total instantaneous delivered power. An offset is added thereto due to the power consumed by the inline power controller and related circuitry. Such offsets will be well known based upon the circuit components and will normally constitute a small percentage of the power delivered to each powered port. CPU 38 is responsible for tracking inline power allocated to the various ports with which it is associated and insuring that power is not allocated in excess of that available.

Figure 4A:
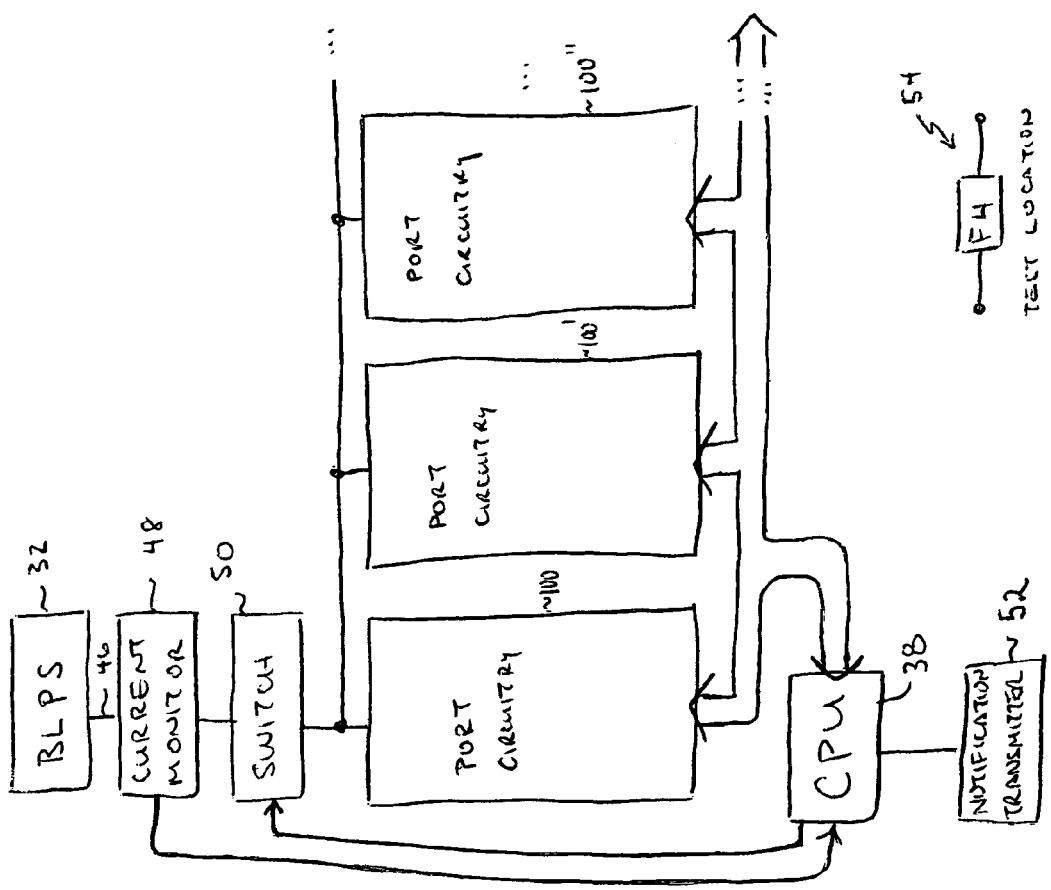
FIGS. 4A and 4B are electrical schematic diagrams in block form of a wired data telecommunications device in accordance with the various embodiments of the present invention.

As inline power has developed, a single board may be called upon to deliver 1000 watts or more (20 amps or more at nominal 48 VDC levels) of inline power to one or more inline power controllers. As a result, while unusual, faults inside or outside the system may conceivably arise which sink amps or tens of amps of current with the potential to harm circuitry on the board and which are within the current limits permitted by existing fuses. Accordingly, the present invention adds additional protection. Turning now to FIG. 4A, BLPS 32 provides current to node 44 over line 46 from which it is directed to inline power controller 36 and to power control device 40. Prior to reaching node 44 the current is monitored at current monitor 48. Current monitor 48 may be any known type of current measuring circuit or element. A reading or output from current monitor 48 is directed to CPU 38 (or any other suitable processor). CPU 38 maintains a database (or equivalent) with which it can determine the current allocated to a particular port 34. It can then determine the total amount of current allocated to ports with which it is associated. If the allocated current drawn by the ports with which it is associated is exceeded as monitored by current monitor 48, CPU 38 may take action to either reverify the sum of allocated currents for all powered ports, then it may cause a notification message to be transmitted to a network control point such as a network operations control (NOC) facility, throttle back the available current by modulating the gate of the FET (field effect transistor) switch 50 through a conventional mechanism known as fold back through the increase of the ON resistance of the FET 50 (e.g., by deploying a device similar to an inline power controller inside the system), and/or deactivate switch 50 so that power delivery is shut down. CPU 38 may also or alternatively measure the change in drawn current per unit time and react to a sudden spike in current draw in the same manner. For example, if a data communications switch has 48 ports and is drawing 8 amps of an available 20 amps and the load suddenly jumps to 12 amps, while this is less than the current that the device is fused for, the jump of 4 amps (corresponding to about 200 watts) is not explained by one or two inline powered devices being plugged in at once but could be explained by some unanticipated short circuit. Accordingly, the CPU 38 may attempt to protect the circuitry by shutting off switch 50 and sending notifications as discussed above. Note that while current monitor 48 is shown here at the output of the BLPS 32, whether the BLPS 32 is present as an independent power supply or merely a connection to another power supply such as the main power supply 30, current monitor 48 may also be deployed inline with fuse F1 between the main power supply 30 and the circuitry of each board coupled to backplane 33. This may be done on either side of the connectors C1/35*a* and C2/35*b* (FIG. 2A) so that the current monitoring circuitry 48 may be disposed on each attached board or on the backplane, as desired.

This current monitoring mechanism acts as a real time dynamic adjustable fast fuse. A regular fuse may need time in the hundreds of milliseconds to "blow" once its current rating is exceeded and it is typically rated at the full-load current for a board, which it, in most cases, will not be drawing and may not exceed even under a potential fault condition. An active circuit can respond much more quickly in tens or hundreds of microseconds, thereby providing robust on-board protection to transient triggered current waves (resulting from latch up of silicon devices) or simply a piece of stray metal or a misapplied tool causing a hard short circuit.

While staying well within the window of current allowed by current monitor 48, the typical current drawn by integrated circuits such as the inline power control 36 should not exceed a range in the tens of milliamperes (ma) since it runs off of a 48 VDC supply.

While the current monitoring mechanism may be useful for an entire board supplying 50 ports or so with inline power, a local fuse such as fuse F3 may be employed to serve as a local guard to each inline power controller integrated circuit 36 should such an integrated circuit suffer a latch up phenomenon that could cause the integrated circuit itself to draw 0.5-1.0 amperes of current resulting in likely circuit and possible board damage due to the heating of the board caused by the excessive current draw.

In accordance with an embodiment of the present invention, such a fuse F3 may be implemented with a surface mount ferrite bead device having a selected limited current carrying capacity. These may be implemented with or without a conventional capacitor in an L-C low pass filter (or other filter) configuration to also block AC (alternating current) noise on the power pin resulting from local and/or external electrical noise. When a ferrite bead attempts to conduct a larger than rated current, it tends to become more resistive until finally opening and failing to conduct any current at all. This avoids the situation where an integrated circuit is sinking one hundred times its rated current but still not pulling enough current to blow or trip a current limiting device such as a fuse, resettable fuse or circuit breaker designed to protect a larger portion of the circuit or board. Many manufacturers make such ferrite bead devices. One, in particular, and by way of example and not of limitation, is Murata Manufacturing Company, Ltd. of Japan (See, e.g., catalog number C31E-12, Aug. 30, 2004, available on the Internet at www.murata.com/catalog/c31e12.pdf). Murata makes a large line of surface mount ferrite bead devices. By selecting a part for an appropriate impedance and rated current for the application in question the fuse effects of the ferrite may be employed to advantage. For example, the BLA2ABB121SN4 device provides four ferrite devices in one package with a 50 ma rated current and only 120 ohms of impedance at 100 MHz (megahertz) and 0.6 ohms of DC resistance. A single ferrite bead from the Murata BLM11XXXXX product series may also be used at the input to current monitor 48. Attempting to feed a current well in excess of 50 ma through the ferrite bead will cause it to stop conducting and act as a fuse to protect the board and downstream circuitry from damage. Other current ratings, impedance ratings and DC resistance ratings are available in single and multi-device packages, as desired.

In another example, fuse F3 may be provided between the power supply 32 and node 44 where fuse F3 is selected to be a surface mount technology (SMT) ferrite device as discussed above selected to provide the current needed by an individual port (at 30 watts, 48 volts DC this is about 625 mA). If desired, a plurality of such ferrite devices may be paralleled to form the fuse. Upon conducting an excessive current, the ferrite devices will become permanently nonconductive, and/or its resistance will increase causing a drop in the supply potential provided to the device powered by it resulting in effective shutdown in a relatively controlled manner as discussed above which it has been discovered will not tend to damage the board or adjacent components. This is not a use to which such ferrite devices have previously been applied. For example, the Murata chip ferrite bead arrays designated by the product designators BLA2AA, BLA2AB, BLA31A and BLA31B have been found suitable. Such devices typically have four parallel inductive ferrite circuits with maximum current ratings in the range of 50 mA to 200 mA. Such devices exhibit low (typically an ohm or less) DC resistance similar families of ferrite bead products from vendors such as TDK of Japan and Murata may also be used for the purposes described herein.

While a more conventional resettable fuse could be used for fuse F3 to provide different degrees of protection, or another active circuit mechanism could be used to monitor current into the integrated circuit 36, the fuse or ferrite approach is simple and inexpensive to implement, may be implemented with relatively small DC resistance between the current source (voltage supply) and the integrated circuit and may also be engineered into a low pass noise filter, e.g., the ferrite bead device would couple the power supply to the pin of the integrated circuit (IC) that has a bypass capacitor across the supply (typical) but the ferrite provides a lossy inductance at higher frequencies causing a filter effect while acting as a fuse under a fault condition, for dual use.

Figure 5:
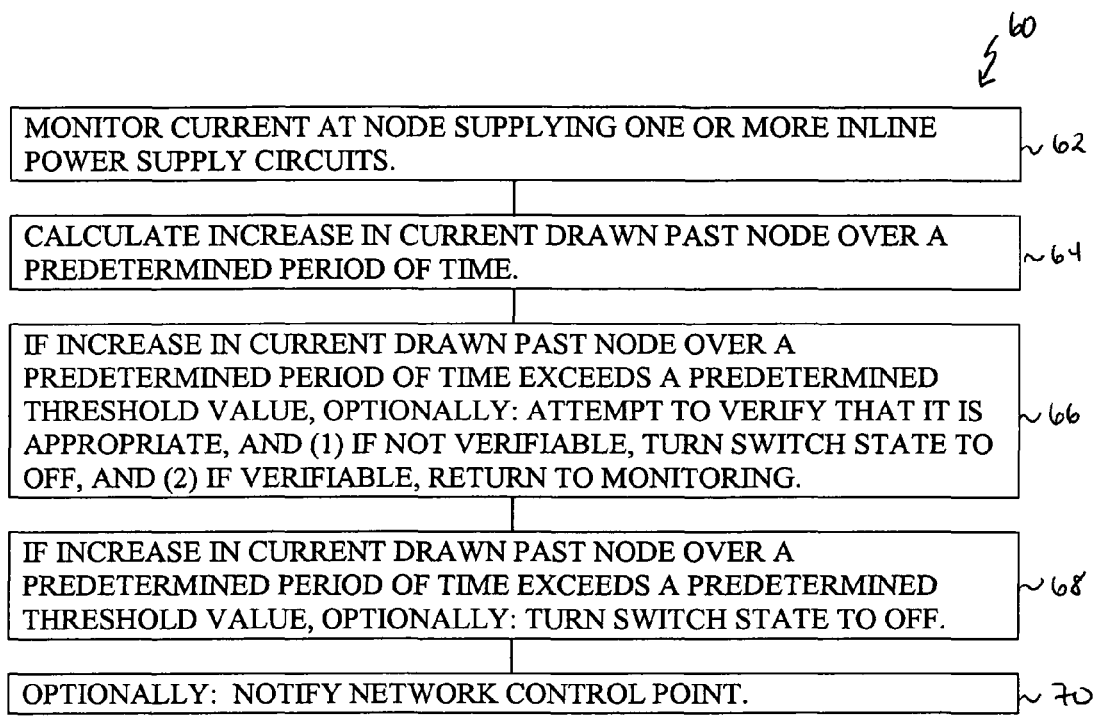
Figure 6:
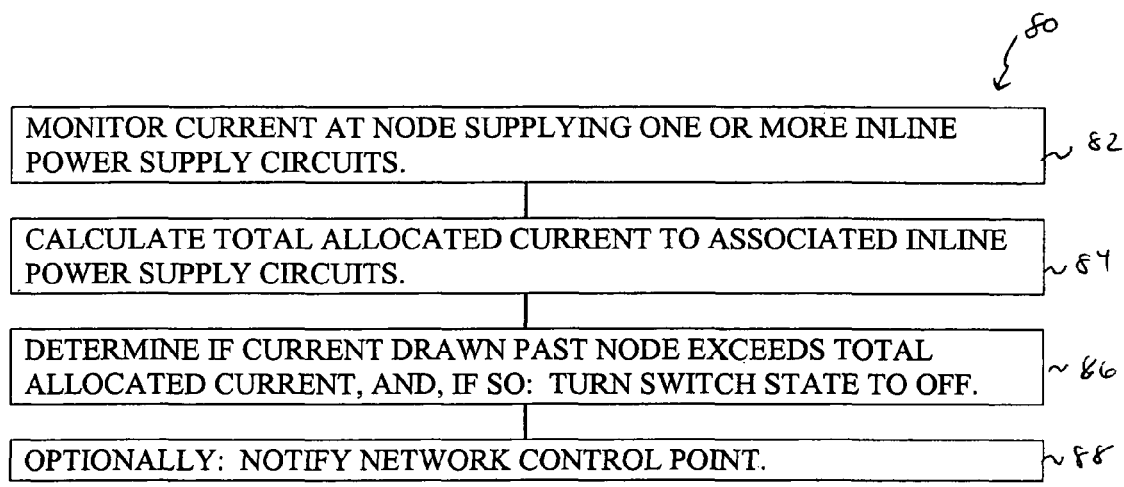

The software or firmware associated with the processor would operate, for example, as illustrated in FIGS. 5 and 6.

Figure 4B:
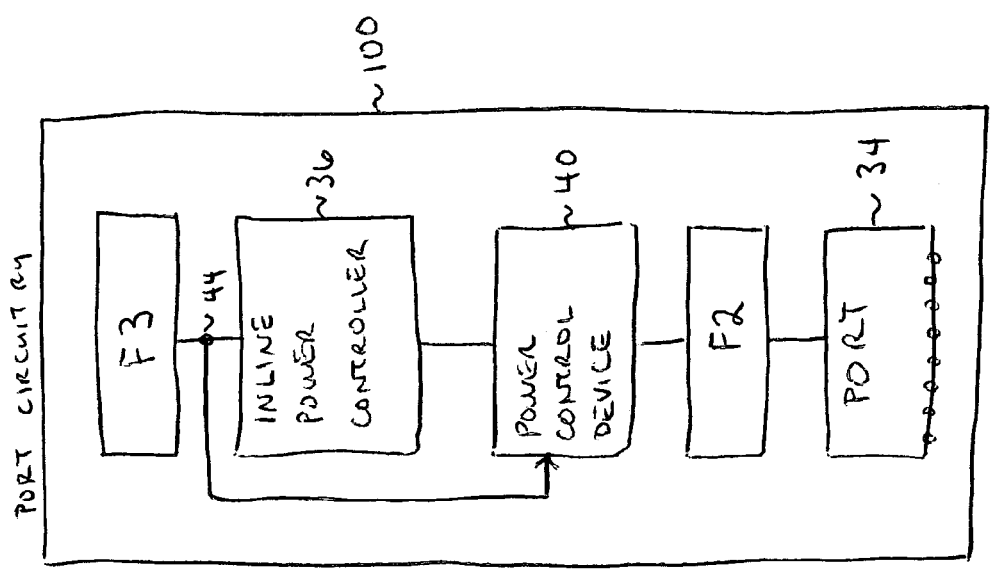
Figure 4A:
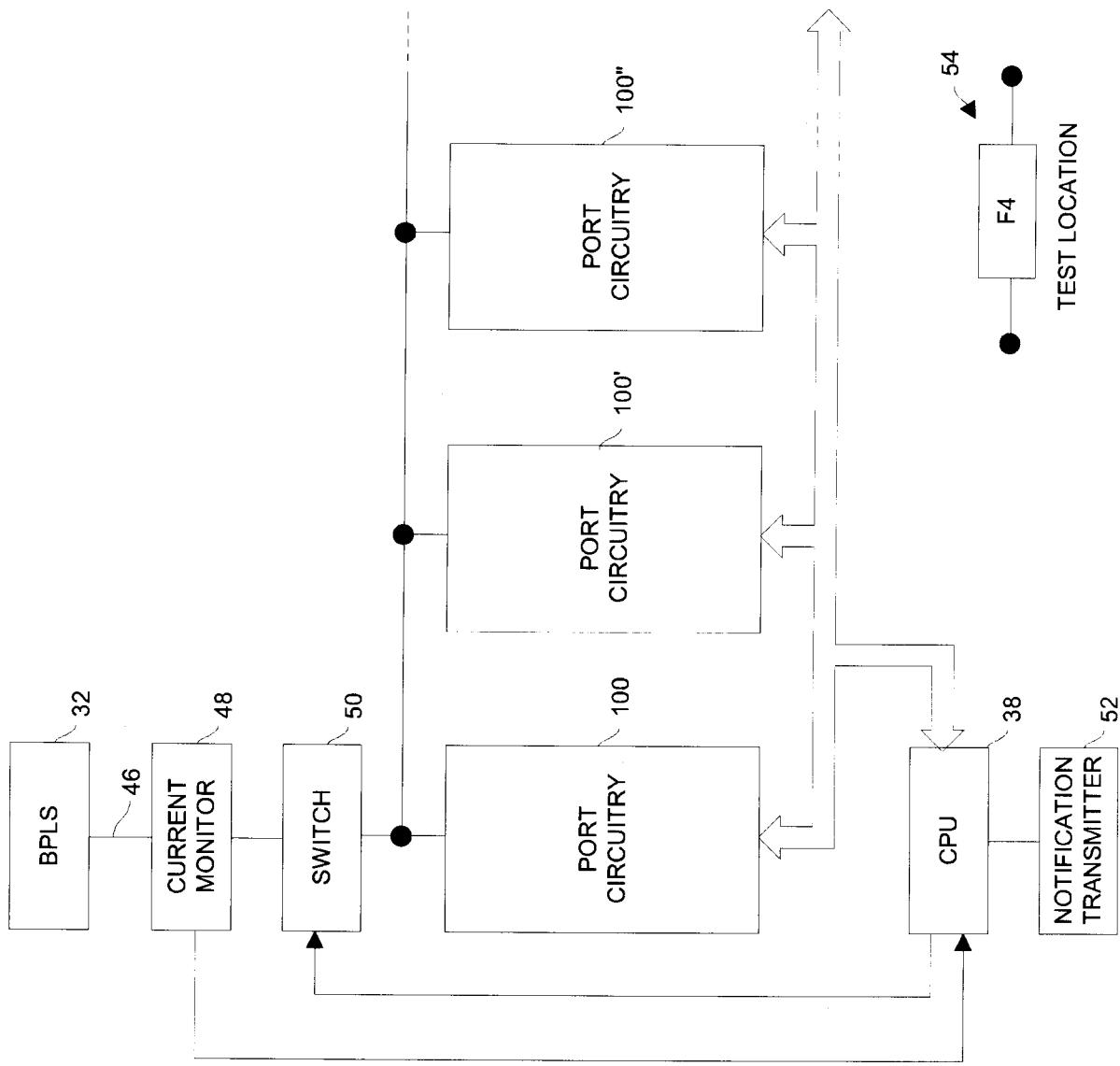
Figure 5:
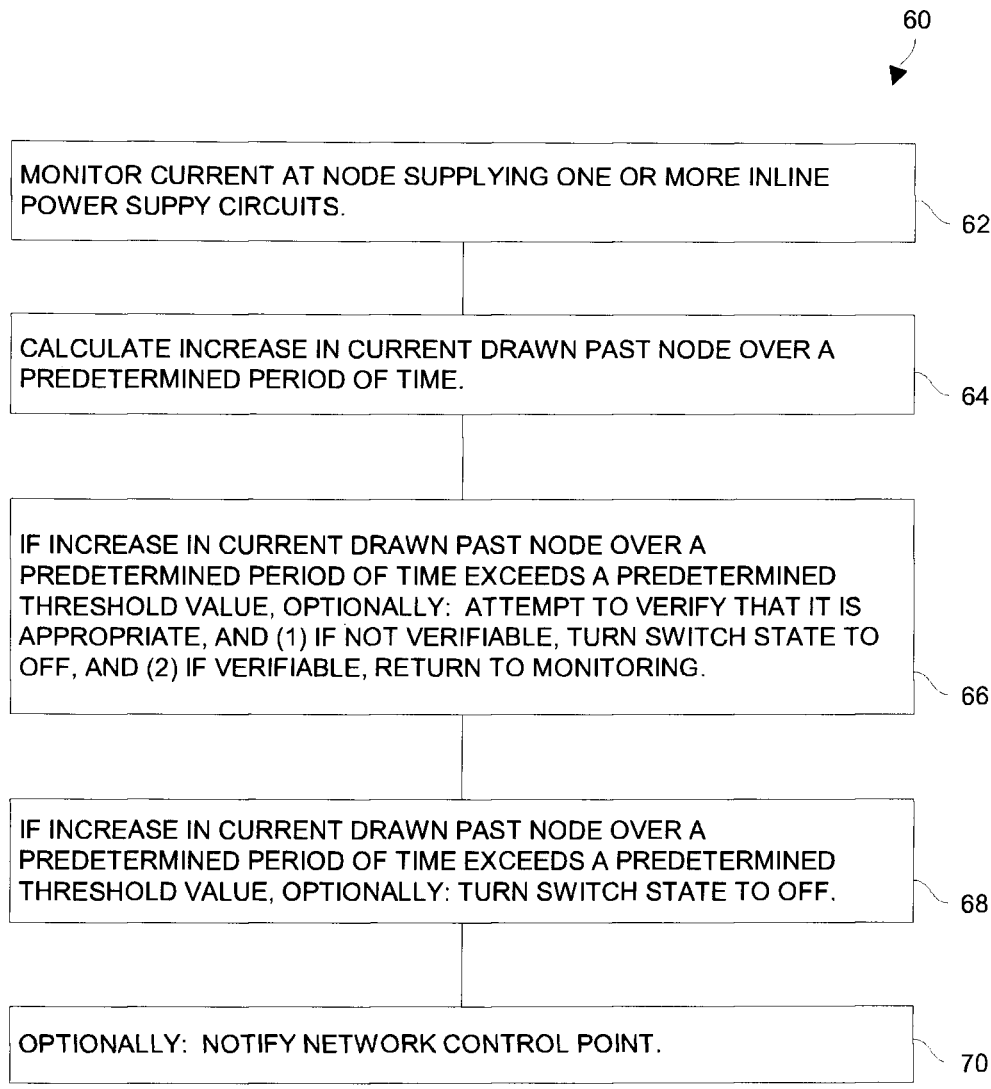
Figure 6:
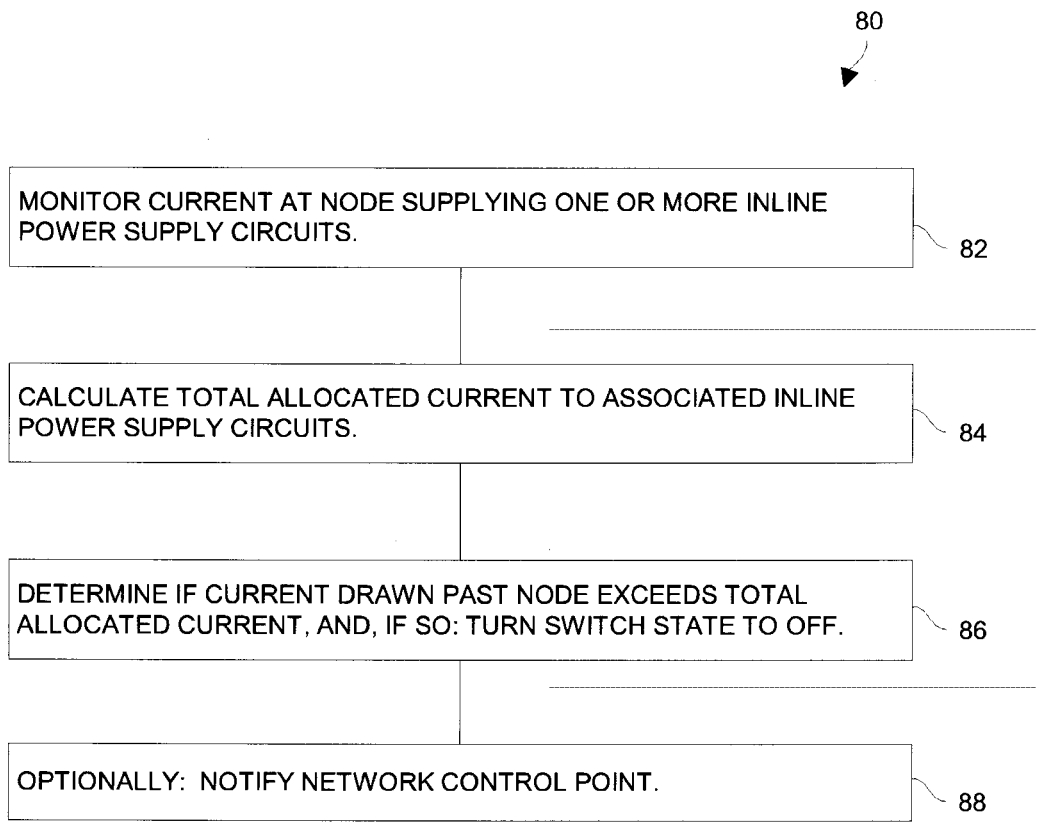
Figure 7:
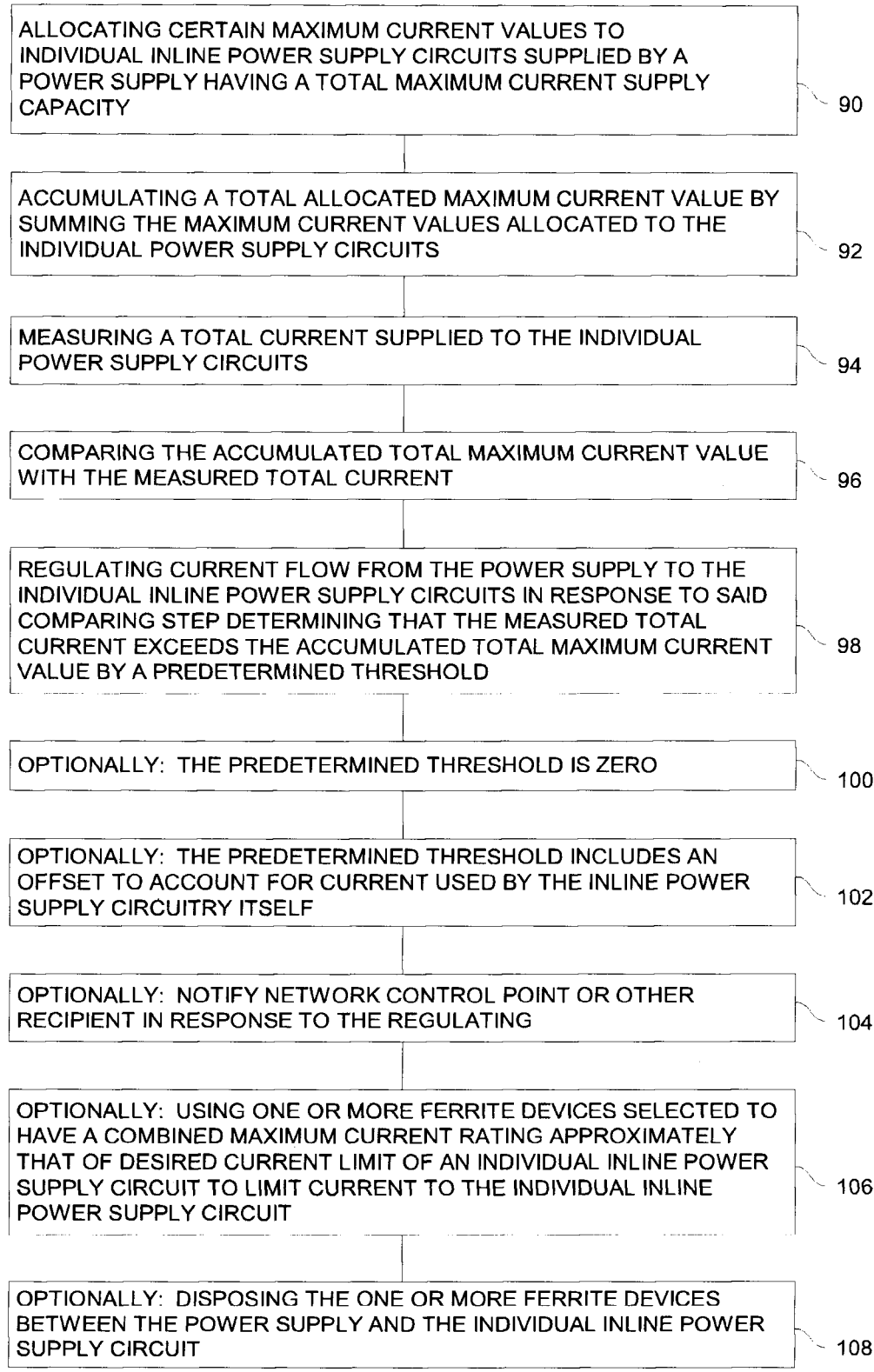
Figure 9:
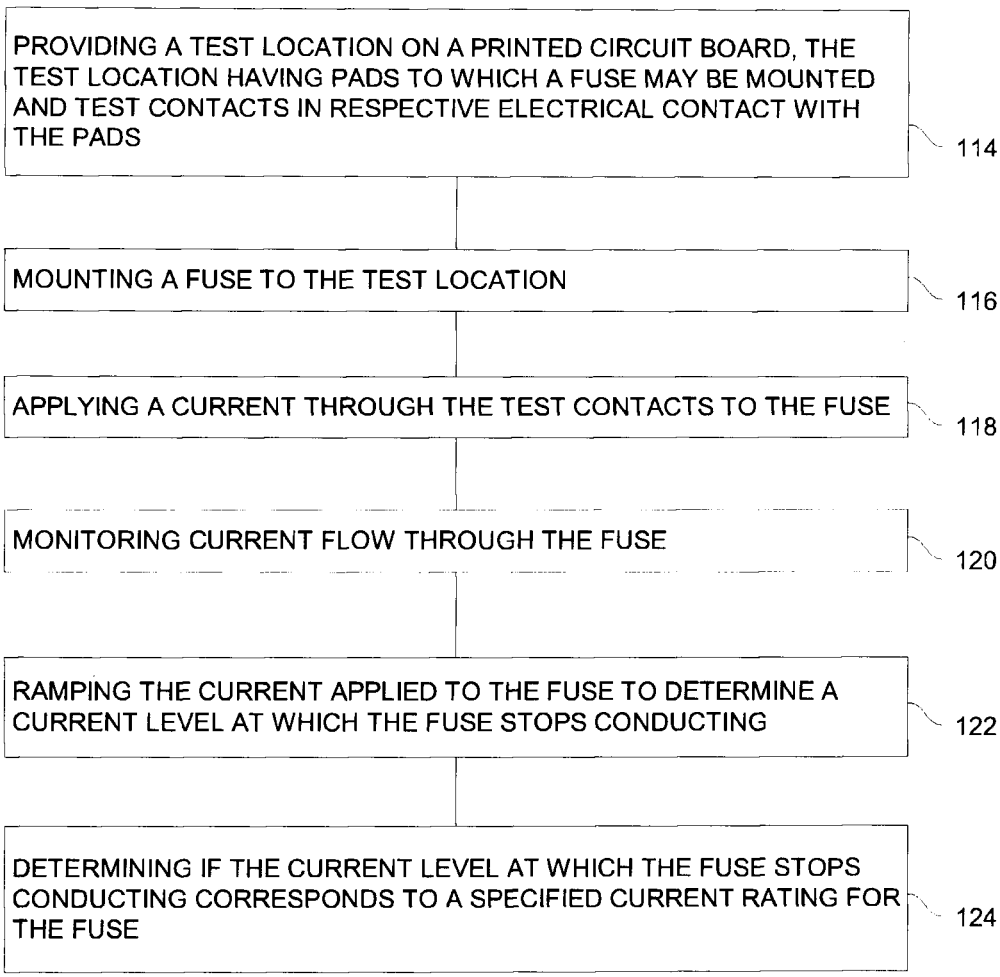

Turning to FIG. 5, a flow diagram 60 illustrates a series of steps that would be carried out by a processor to implement a process for detecting an excessive current spike and responding to it. At step 62 the current is monitored at the node supplying one or more inline power supply circuits, as at current monitor 48 in FIG. 4. The current value may be digitized and stored at CPU 38 or in associated memory (not shown). At step 64 any increase in current drawn past the node over a predetermined period of time is calculated by the CPU 38. At step 66 if the increase in current calculated in step 64 exceeds a predetermined threshold value, then the CPU may attempt to verify that the current spike is appropriate (for example, one or more of the attached devices may be of a known type that requires current spikes, or the power to the entire communications device may have been recently cycled leading to a large initial current spike). Conventional deglitching filters may be deployed via digital or analog means to weed out the operational current spikes inevitable in such circuits while real latch up or "short" based current spikes or pulses are recognized and neutralized. If the current spike is determined to be appropriate, then the CPU 38 returns to monitoring at step 62. If not, it may turn the switch state of switch 50 to OFF and/or notify a network control point (70) such as a network operations control (NOC) facility or an individual or the like of the detected event. At step 68 the CPU 38 alternately or additionally implements a check to see if the current drawn exceeds a predetermined threshold value. If it does, it stores the state of the system to memory, e.g., date, time, powered ports, current drawn, the status of each inline power controller (e.g., if any is not responding), and the like, then it may turn the switch state of switch 50 to OFF and/or notify a network control point (70) such as a network operations control (NOC) facility or an individual or the like of the detected event. This might be desirable to implement in addition to the step described at 66 because one level of current spike might be permissible under certain circumstances and a higher level might never be permissible. Such levels and time periods may be set in conventional ways with firmware or software settings. If desired, the above functionality may be implemented with analog circuitry provided via similar circuitry that exists in the inline power controller integrated circuit 36 associated with each port, with a more involved algorithm that can control the gate of the switch FET 50 and throttle back the available current temporarily, as will now be apparent to those of ordinary skill in the art.

Turning now to FIG. 6, another monitoring process 80 may be alternately or additionally implemented by CPU 38. At step 82 the current through the node supplying one or more inline power supply circuits is monitored for magnitude. At step 84 the CPU 38 calculates the total allocated current to all associated inline power supply circuits (possibly including any power dissipated in cabling and the like). This may be done at any point in time. At step 86 the CPU 38 determines if the current drawn (and measured) past the node exceeds the total allocated current. If it does, then it saves the system status to memory as detailed above and it may turn the switch state of switch 50 to OFF and/or notify a network control point (88) such as a network operations control (NOC) facility or an individual or the like of the detected event.

Figure 7:
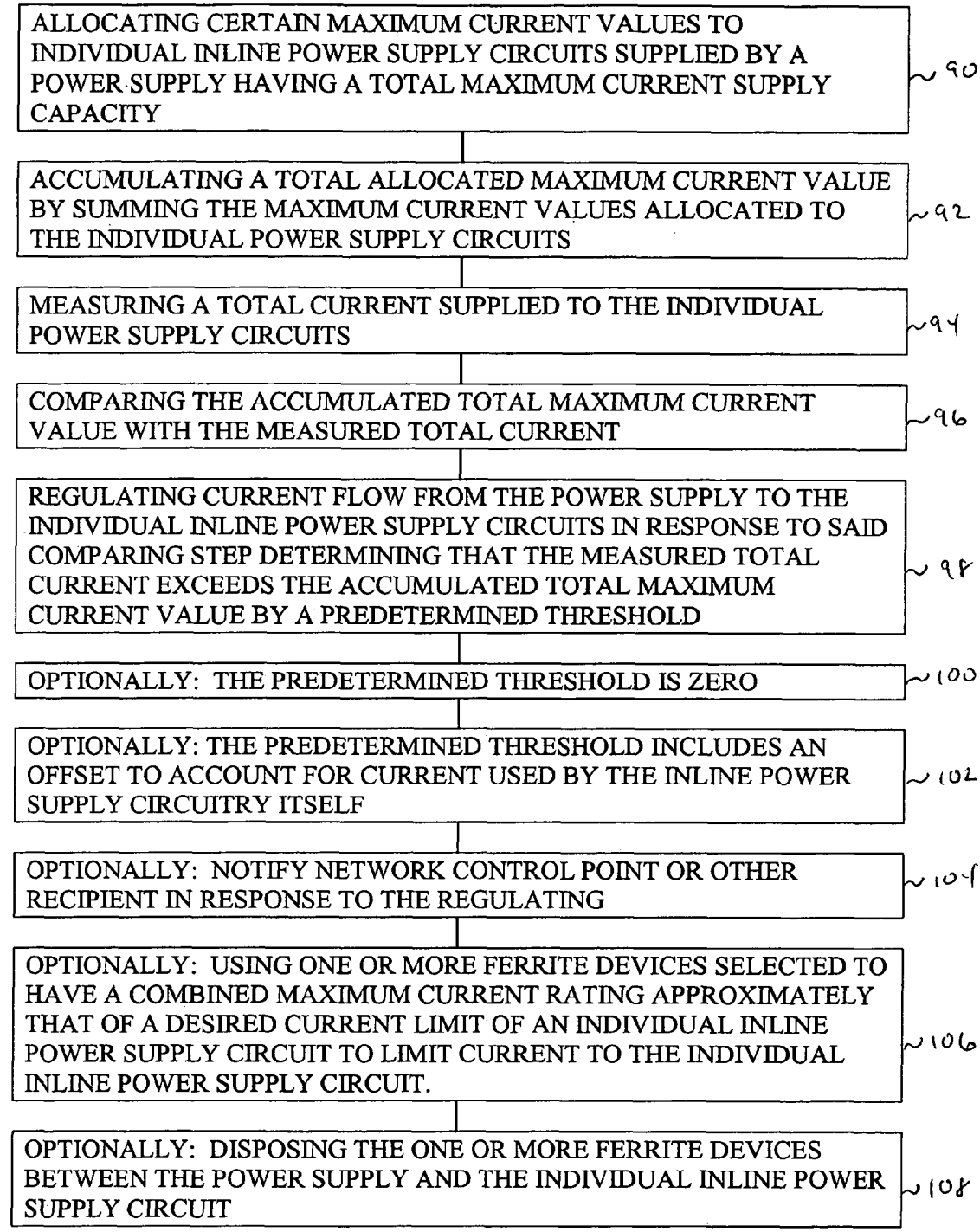

Turning now to FIG. 7, a method in accordance with an embodiment of the present invention is described and shows. In accordance with the embodiment of FIG. 7, at block 90, the process allocates certain maximum current values to individual power supply circuits supplied by a power supply having a total maximum current supply capacity. At block 92 a total allocated maximum current value is accumulated by summing the maximum current values allocated to the individual power supply circuits. At block 94 a total current supplied to the individual power supply circuits is measured. At block 96 the accumulated total maximum current value is compared with the total measured current and at block 98 the current flow from the power supply to the individual inline power supply circuits is regulated (folded back, ceased, or otherwise controlled) if necessary in response to a determination made in the comparing process that the measured total current exceeds the accumulated total maximum current value (or is too close to it) by a predetermined threshold (which may be zero (100), negative (in order to leave a margin) or positive (102) in order to provide an offset to account for power used in the wiring and active circuitry of the inline power supply circuitry itself. In block 104 a notification may be provided if the circuitry starts to current regulate. In block 106 one or more ferrite devices may be used with a combined maximum current rating approximately that of a desired current limit of an individual inline power supply circuit to limit current to the individual inline power circuit. In block 108 the ferrite devices may be placed between the power supply and the individual inline power supply circuit.

Turning now to FIG. 8, a method in accordance with an embodiment of the present invention is described and shows. In accordance with the embodiment of FIG. 8, at block 110, power is provided from a power supply to an individual inline power supply circuit. At block 112 the power supply feeds current to the individual inline power supply over a conductor having disposed therein one or more ferrite devices selected to have a combined maximum current rating approximately that of a desired current limit of the individual inline power supply circuit.

Figure 9:
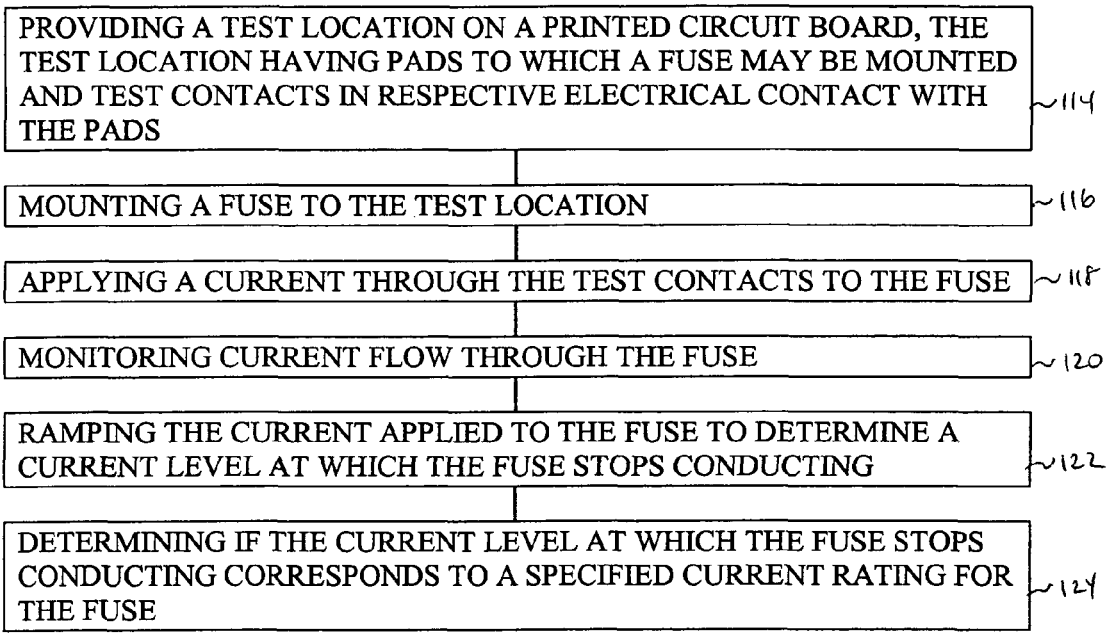
Figure 1A:
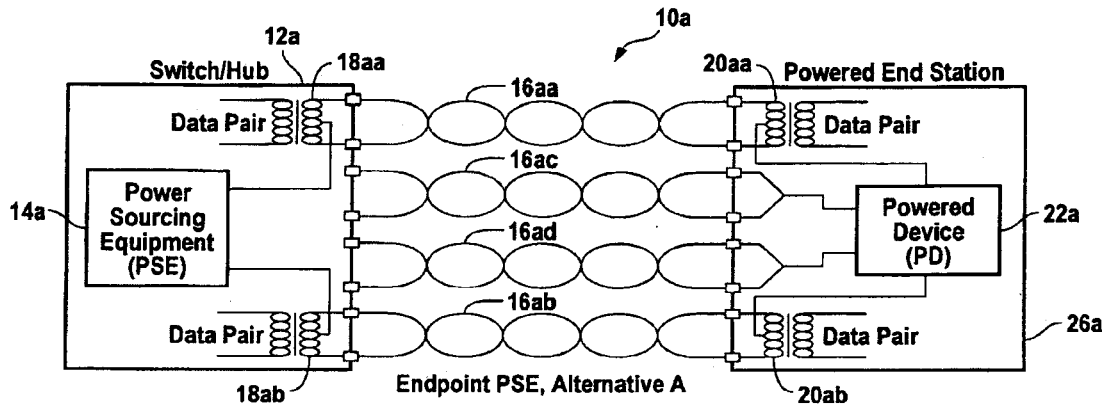
Figure 1B:
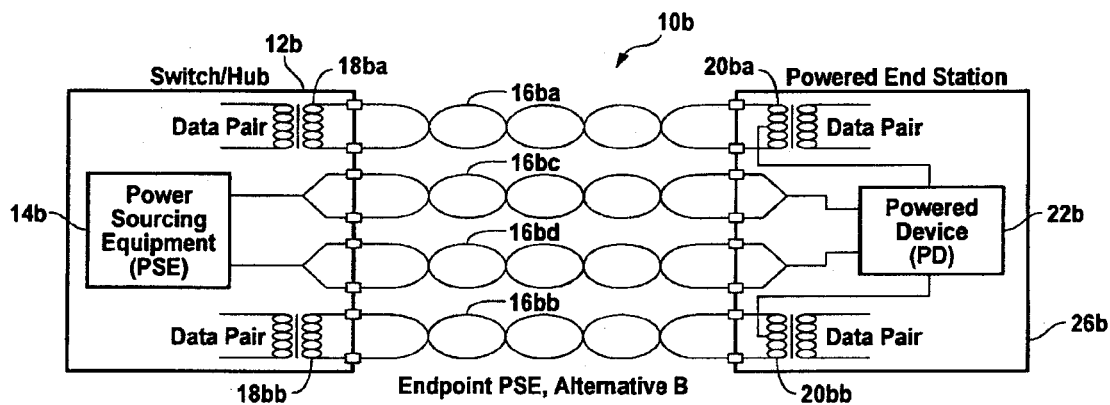
Figure 1C:
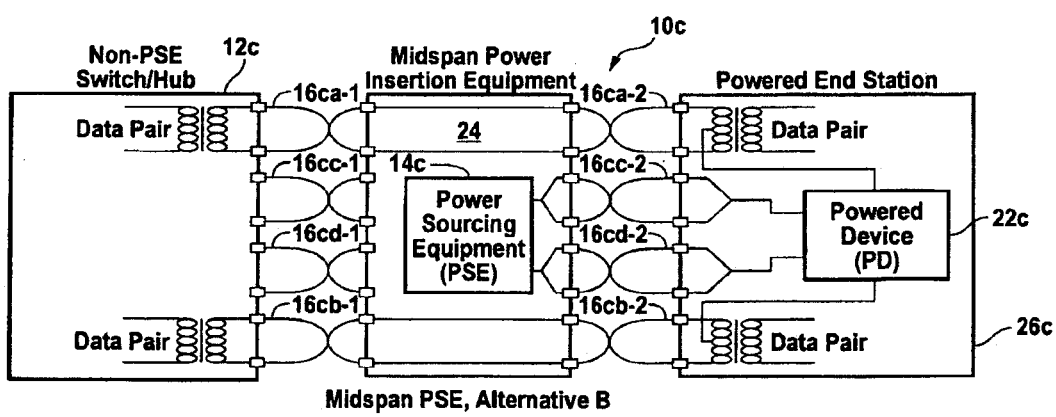
Figure 1D:
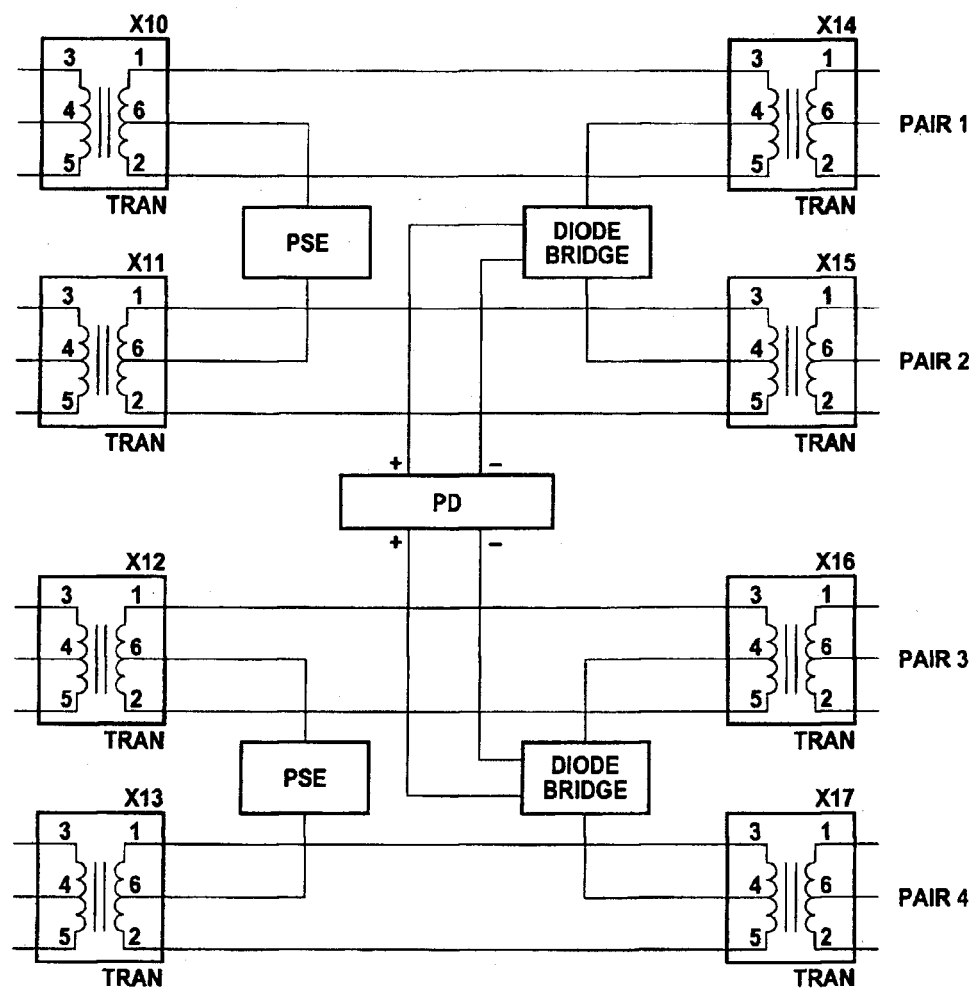
Figure 1E:
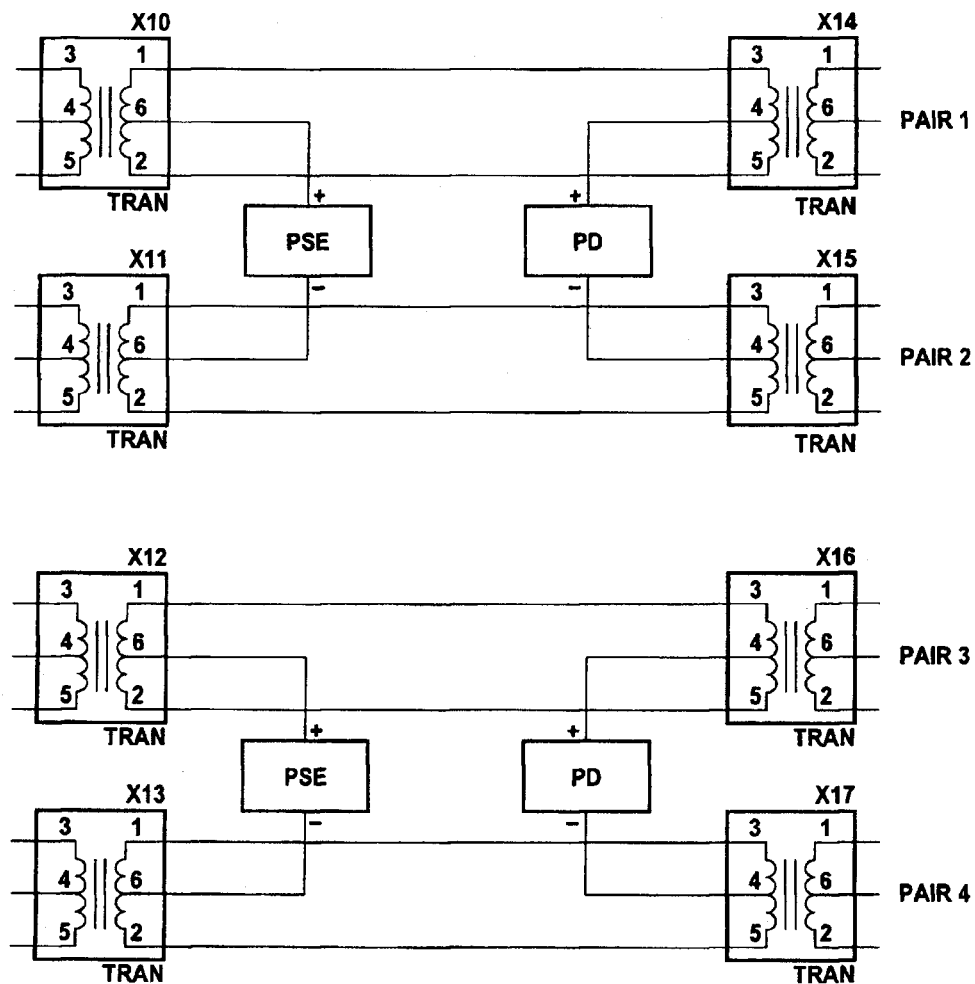

Turning now to FIG. 9, a method in accordance with an embodiment of the present invention is described and shows. In accordance with the embodiment of FIG. 9, at block 114 a test location is provided on a printed circuit board, the test location having pads to which a fuse may be mounted and test contacts in respective electrical contact with the pads. At block 116 a fuse is mounted to the test location. At block 118, a current is applied through the test contacts to the fuse. At block 120, current flowing through the fuse is monitored in a conventional manner. At block 122, the current applied to the fuse is ramped so as to determine a current level at which the fuse stops conducting. At block 124 it is determined if the current level at which the fuse stops conducting corresponds to a specified current rating for the fuse.

The notification functions discussed above may be carried out in any suitable manner, for example, a notification transmitter 52 such as a wireless communication facility may be provided to transmit the notification from the CPU 38 to a wireless access point on a wired data communications network from which the notification message could be routed in a conventional manner. Alternatively or additionally a port of the data communications device could be used to transmit the message over a wired data telecommunications network. In such a case, it would be best to use a port not about to be powered down in response to a detected fault event as described above.

Finally, where a board is assembled with fuses (either conventional, resettable or ferrite-based as described above), current manufacturing practice dictates that a reel of fuse components will be mounted on a pick and place manufacturing machine which then assembles the board prior to reflow soldering. Once assembled and soldered, the board cannot readily be tested to verify that the correct fuses were installed. If incorrect fuses were installed, then if they are rated at currents greater than desired, this defect will only be discovered if the board is subjected to a fault and the fuses fail to perform their function at that point. Similarly, if the incorrect fuses are rated for too small a current, failures may occur randomly without apparent reason as normal currents cause the fuses to become nonconductive. In accordance with another aspect of this invention, certain fuses will be assembled onto the board at a "test" location where they can be subjected to a ramped current to determine the current level at which they will fuse. If the current level at which they fuse is the expected current level, then the board will pass the test. If the current level at which they fuse is not the expected current level (either too high or too low), then the board will not pass the test. By instructing the pick and place assembly equipment to install at the test location 54 (FIG. 4) a fuse identical (e.g., F4 of FIG. 4) to those installed in other locations of the board (e.g., F3 of FIG. 4), the possibility of an erroneous fuse selection during manufacturing can now be tested, for example, by conventional probe testing or any other suitable method as will now be apparent to those of ordinary skill in the art.

While the active dynamic adjustable fast fuse concept described above may be deployed to protect the local BLPS 32 of FIGS. 2A, 2B, similar techniques may be deployed to protect the main (shared) power supply 30 coupled to the backplane 33. Such techniques would insure that no board fed power over the backplane from the main power supply 30 causes an uncontrolled current surge that could adversely affect other boards fed from the same main power supply 30 or the main power supply 30 itself. Given the nature of inline power applications and the probability of no more than a few devices being turned on at once or requiring a change in load in excess of normal requirements but less than the rated currents of conventional fuses, the technique may be applied at the backplane 33 or at the main power supply 30. Should a failure occur at the connector where the BLPS 32 plugs into the backplane 33 or a component fails in a shorted condition on a BLPS 32, an active fuse as described above may prove more robust for system performance. To implement this a communications channel must be provided among the attached boards and the main power supply 30 to allow the active fuse to know what the instantaneous legitimate current demand from each board is supposed to be. The active fuse will then add up all of the demanded current, provide some margin, and be prepared to trip off or fold back in the event that demanded current is exceeded by actual current draw. While the present invention has been shown and described in the context of inline power delivery over a wired data telecommunications network, it also has applicability to other wired systems involving the delivery of power where a fast response to a possible fault is desired even if the fault does not cause a current level to rise to a level which would trip a circuit breaker or blow a fuse.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. A monitoring circuit for inline power supply circuitry of a circuit board blade, the monitoring circuit comprising:
a current monitor carried by the circuit board blade and configured to measure current supplied from a board level power supply carried by the circuit board blade, the circuit board blade comprising the board level power supply as an on-board power supply, to the inline power supply circuitry carried by the circuit board blade to generate a current measurement value associated with the inline power supply circuitry;
a processor carried by the circuit board blade and associated with the inline power supply circuitry, the processor configured to calculate, over time and as a threshold, a total amount of current allocated to a set of active network ports of a set of network ports associated with the inline power supply control circuitry disposed on the circuit board blade, the set of network ports configured to provide power to a powered device, and the processor configured to receive the current measurement value associated with the circuit board blade from the current monitor; and
a current control device carried by the circuit board blade and coupling the inline power supply circuitry disposed on the circuit board blade to the board level power supply disposed on the circuit board blade, the current control device configured to regulate current flow from the board level power supply disposed on the circuit board blade to the inline power supply circuitry disposed on the circuit board blade, the current control device controlled by the processor;
wherein the processor is configured to:
when the current measurement value associated with the current drawn by the set of active network ports disposed on the circuit board blade exceeds the threshold, detect a current spike having a current spike characteristic,
when the current spike has a first current spike characteristic indicative of an expected increase in current drawn by one or more ports of a set of ports of the circuit board blade, maintain current flow at the current measurement value associated with the circuit board blade through the current control device, and
when the current spike has a second current spike characteristic indicative of a short circuit on the circuit board blade, reduce current flow from the current measurement value associated with the circuit board blade through the current control device,
wherein when calculating, over time and as the threshold, the total amount of current allocated to the set of active network ports of the set of network ports associated with the inline power supply control circuitry, the processor is configured to calculate a dynamically detected threshold by adding, at a given recurring time interval associated with operation of the monitoring circuit, the direct current allocated to each of the active network ports of the set of network ports associated with the inline power supply control circuitry, the dynamically detected threshold representing the total amount of current allocated to the set of network ports at the given time interval during a duration of operation of the monitoring circuit.

2. The monitoring circuit of claim 1, further comprising a notification transmitter responsive to the current spike to transmit a notification to a recipient.

3. The monitoring circuit of claim 1, wherein the first current spike characteristic indicates cycling of power in the inline power circuitry between a disengaged state and an engaged state.

4. The monitoring circuit of claim 1, wherein the second current spike characteristic indicates that the powered device is configured to receive current below the threshold.

5. The monitoring circuit of claim 1, wherein the processor is configured to store a record of the current spike to memory when the current spike has the second current spike characteristic.

6. The monitoring circuit of claim 5, wherein the processor is configured to store a record of the current condition to memory if the current spike has the second current spike characteristic, the record including at least one of a date, a time, a powered port, an amount of current drawn, and a status of the monitoring circuit.

7. The monitoring circuit of claim 1, wherein:
the inline power supply circuitry is standardized to IEEE Standard 802.3af;
the first current spike characteristic indicates that the processor has analyzed the powered device in electrical communication with the monitoring circuit and determined that for that particular powered device the current spike is permissible;
the second current spike characteristic indicates that the processor has analyzed the powered device in electrical communication with the monitoring circuit and determined that for that particular powered device the current spike is impermissible; and
the current control device is configured to operate as an enhanced surge protector to prevent the transmission of the current spike if the current spike is impermissible while allowing the current spike if the current spike is permissible when the current spike has a current value greater than the threshold.

8. The monitoring circuit of claim 1, wherein:
the board level power supply carried by the circuit board blade is configured to connect to a backplane and receive power from a main power supply; and
the circuit board blade carries at least one port configured to provide power to a powered device distinct from the circuit board blade, the inline power supply circuitry configured to provide current to the at least one port carried by the circuit board blade in response to the current control device.

9. The monitoring circuit of claim 1, wherein when calculating the dynamically detected threshold at the given recurring time interval associated with operation of the monitoring circuit, the processor is configured to calculate the dynamically detected threshold over a set of periodic time intervals occurring at a given frequency during the duration of operation of the monitoring circuit.

10. The monitoring circuit of claim 1, wherein when calculating the dynamically detected threshold at a recurring time interval associated with operation of the monitoring circuit, the processor is configured to calculate the dynamically detected threshold in real time during operation of the monitoring circuit.

11. The monitoring circuit of claim 1, wherein when the current measurement value associated with the current drawn by the set of active network ports disposed on the circuit board blade exceeds the dynamically detected threshold, prior to detecting the current spike having the current spike characteristic, the processor is configured to (1) recalculate the sum of allocated direct currents allocated to each of the active network ports of the set of network ports associated with the inline power supply control circuitry and (2) verify the recalculated sum of allocated direct currents allocated to each of the active network ports as being equal to the dynamically detected threshold representing the total amount of current allocated to the set of network ports at the given time interval during a duration of operation of the monitoring circuit.

12. A computer networking system utilizing inline power supply circuitry, the system comprising:
a main power supply;
at least one circuit board blade configured to receive inline power from the main power supply; and
a backplane configured to pass inline power from the main power supply to the at least one circuit board blade, the circuit board blade including a monitoring circuit including:
a current monitor carried by the circuit board blade and configured to measure current supplied from a board level power supply carried by the circuit board blade, the circuit board blade comprising the board level power supply as an on-board power supply, to the inline power supply circuitry carried by the circuit board blade to generate a current measurement value associated with the inline power supply circuitry;
a processor carried by the circuit board blade and associated with the inline power supply circuitry, the processor configured to calculate, over time and as a threshold, a total amount of current allocated to a set of active network ports of a set of network ports associated with the inline power supply control circuitry disposed on the circuit board blade, the set of network ports configured to provide power to a powered device, and the processor configured to receive the current measurement value associated with the circuit board blade from the current monitor; and
a current control device carried by the circuit board blade and coupling the inline power supply circuitry disposed on the circuit board blade to the board level power supply disposed on the circuit board blade, the current control device configured to regulate current flow from the board level power supply disposed on the circuit board blade to the inline power supply circuitry disposed on the circuit board blade, the current control device controlled by the processor;
wherein the processor is configured to:
when the current measurement value associated with the current drawn by the set of active network ports disposed on the circuit board blade exceeds the threshold, detect a current spike having a current spike characteristic,
when the current spike has a first current spike characteristic indicative of an expected increase in current drawn by one or more ports of a set of ports of the circuit board blade, maintain current flow at the current measurement value associated with the circuit board blade through the current control device, and
when the current spike has a second current spike characteristic indicative of a short circuit on the circuit board blade, reduce current flow from the current measurement value associated with the circuit board blade through the current control device,
wherein when calculating, over time and as the threshold, the total amount of current allocated to the set of active network ports of the set of network ports associated with the inline power supply control circuitry, the processor is configured to calculate a dynamically detected threshold by adding, at a given recurring time interval associated with operation of the monitoring circuit, the direct current allocated to each of the active network ports of the set of network ports associated with the inline power supply control circuitry, the dynamically detected threshold representing the total amount of current allocated to the set of network ports at the given time interval during a duration of operation of the monitoring circuit.

13. The computer networking system of claim 12, wherein when calculating the dynamically detected threshold at the given recurring time interval associated with operation of the monitoring circuit, the processor is configured to calculate the dynamically detected threshold over a set of periodic time intervals occurring at a given frequency during the duration of operation of the monitoring circuit.

14. The system of claim 12, wherein the first current spike characteristic indicates cycling of power in the inline power circuitry between an engaged state and a disengaged state.

15. The system of claim 12, wherein the second current spike characteristic indicates that the powered device is configured to receive current below the threshold.

16. The system of claim 12, wherein:
the inline power supply circuitry is standardized to IEEE Standard 802.3af;
the first current spike characteristic indicates that the processor has analyzed the powered device in electrical communication with the monitoring circuit and determined that for that particular powered device the current spike is permissible;
the second current spike characteristic indicates that the processor has analyzed the powered device in electrical communication with the monitoring circuit and determined that for that particular powered device the current spike is impermissible; and
the current control device is configured to operate as an enhanced surge protector to prevent the transmission of the current spike if the current spike is impermissible while allowing the current spike if the current spike is permissible when the current spike has a current value greater than the threshold.

17. The system of claim 16, wherein, when reducing current flow from the current measurement through the current control device, the processor is configured to throttle back available current by modulating a gate of a field effect transistor switch in the current control device using a fold back mechanism that reduces voltage.

18. The system of claim 12, wherein the inline power supply circuitry comprises an inline power controller configured to establish required levels of power supplied to a port carried by the circuit board blade and disposed in electrical communication with the inline power supply, to measure a current drawn by the port, and to supply the processor with data related to the current drawn by the port.

19. The system of claim 18, wherein the inline power supply circuitry comprises a fuse carried by the circuit board blade, the fuse disposed in electrical communication between the inline power controller and the board level power supply, the fuse configured to guard the inline power controller from an over current condition.

20. The system of claim 19, wherein the fuse is configured as a surface mount ferrite bead device, the surface mount ferrite bead device carried by the circuit board blade.

21. The system of claim 18, wherein the inline power supply circuitry comprises a fuse carried by the circuit board blade, the fuse disposed in electrical communication between the inline power controller and the port carried by the circuit board blade.

22. The computer networking system of claim 12, wherein when calculating the dynamically detected threshold at a recurring time interval associated with operation of the monitoring circuit, the processor is configured to calculate the dynamically detected threshold in real time during operation of the monitoring circuit.

23. The computer networking system of claim 12, wherein when the current measurement value associated with the current drawn by the set of active network ports disposed on the circuit board blade exceeds the dynamically detected threshold, prior to detecting the current spike having the current spike characteristic, the processor is configured to (1) recalculate the sum of allocated direct currents allocated to each of the active network ports of the set of network ports associated with the inline power supply control circuitry and (2) verify the recalculated sum of allocated direct currents allocated to each of the active network ports as being equal to the dynamically detected threshold representing the total amount of current allocated to the set of network ports at the given time interval during a duration of operation of the monitoring circuit.

24. A method for monitoring current provided to inline power supply circuitry of a circuit board blade from a board level power supply having a total maximum current supply capacity, the method comprising
measuring a current supplied from a board level power supply carried by the circuit board blade to the inline power supply circuitry carried by the circuit board blade to generate a current measurement value associated with the circuit board blade;
calculating, over time and as a threshold, a total amount of current allocated to a set of active network ports of a set of network ports associated with the inline power supply control circuitry disposed on the circuit board blade, the set of network ports configured to provide power to a powered device;
when the current measurement value associated with the current drawn by the set of active network ports disposed on the circuit board blade exceeds the threshold, detecting a current spike having a current spike characteristic,
when the current spike has a first current spike characteristic indicative of an expected increase in current drawn by one or more ports of a set of ports of the circuit board blade, maintaining current flow at the current measurement value associated with the circuit board blade through the current control device, and
when the current spike has a second current spike characteristic indicative of a short circuit on the circuit board blade, reducing current flow from the current measurement value associated with the circuit board blade, through a current control device, to regulate current flow from the board level power supply to the inline power supply circuitry, the current control device carried by the circuit board blade and coupling the inline power supply circuitry to the board level power supply,
wherein the calculating, over time and as the threshold, the total amount of current allocated to the set of active network ports of the set of network ports associated with the inline power supply control circuitry, includes calculating a dynamically detected threshold by adding, at a given recurring time interval associated with the monitoring method, the direct current allocated to each of the active network ports of the set of network ports associated with the inline power supply control circuitry, the dynamically detected threshold representing the total amount of current allocated to the set of network ports at the given time interval during a duration of operation of the monitoring method.

25. The method of claim 24, wherein the calculating of the dynamically detected threshold at the given recurring time interval associated with operation of the monitoring method includes calculating a dynamically detected threshold over a set of periodic time intervals occurring at a given frequency during the duration of operation of the monitoring method.

26. The method of claim 24, wherein the calculating of the dynamically detected threshold at a recurring time interval associated with operation of the monitoring method includes calculating the dynamically detected threshold in real time during operation of the monitoring method.

27. The method of claim 24, further including, when the current measurement value associated with the current drawn by the set of active network ports disposed on the circuit board blade exceeds the dynamically detected threshold and prior to detecting the current spike having the current spike characteristic, (1) recalculating the sum of allocated direct currents allocated to each of the active network ports of the set of network ports associated with the inline power supply control circuitry and (2) verifying the recalculated sum of allocated direct currents allocated to each of the active network ports as being equal to the dynamically detected threshold representing the total amount of current allocated to the set of network ports at the given time interval during a duration of operation of the monitoring circuit.

* * * * *

UNITED STATES PATENT AND TRADEMARK OFFICE
CERTIFICATE OF CORRECTION

PATENT NO. : 8,149,683 B2
APPLICATION NO. : 11/133012
DATED : April 3, 2012
INVENTOR(S) : Roger A. Karam It is certified that error appears in the above-identified patent and that said Letters Patent is hereby corrected as shown below:

The title page should be deleted and substitute therefor the attached title page.

Replace figures 1A, 1B, 1C, 1D, 1E, 2A, 2B, 3, 4A, 4B, 5, 6, 7, 8, and 9 with the attached replacement sheets.

Signed and Sealed this
Third Day of July, 2012

David J. Kappos
*Director of the United States Patent and Trademark Office*

CERTIFICATE OF CORRECTION (continued)

(12) United States Patent
Karam

(10) Patent No.: US 8,149,683 B2
(45) Date of Patent: Apr. 3, 2012

(54) FAIL-SAFE INLINE POWER IN A WIRED DATA TELECOMMUNICATIONS NETWORK

(75) Inventor: Roger A. Karam, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 996 days.

(21) Appl. No.: 11/133,012

(22) Filed: May 18, 2005

(65) Prior Publication Data

US 2006/0262713 A1 Nov. 23, 2006

(51) Int. Cl.
*H04L 5/20* (2006.01)
*G06F 1/00* (2006.01)

(52) U.S. Cl. ........................... 370/200; 713/340
(58) Field of Classification Search ............. 370/200
See application file for complete search history.

(56) References Cited

U.S. PATENT DOCUMENTS

| | | | |
|---|---|---|---|
| 3,631,534 A * | 12/1971 | Hirota et al. | 336/155 |
| 4,835,737 A | 5/1989 | Herrig et al. | |
| 4,970,623 A * | 11/1990 | Pintar | 361/187 |
| 5,122,691 A | 6/1992 | Balakrishnan | |
| 5,237,511 A | 8/1993 | Caird et al. | |
| 5,264,833 A * | 11/1993 | Jeffers et al. | 340/632 |
| 5,268,592 A | 12/1993 | Bellamy et al. | |
| 5,289,359 A | 2/1994 | Ziermann | |
| 5,386,567 A | 1/1995 | Lien et al. | |
| 5,406,260 A | 4/1995 | Cummings et al. | |
| 5,461,671 A | 10/1995 | Sakuragi et al. | |
| 5,483,574 A | 1/1996 | Yuyama | |
| 5,491,804 A | 2/1996 | Heath et al. | |
| 5,531,612 A | 7/1996 | Goodall et al. | |
| 5,608,792 A | 3/1997 | Laidler | |
| 5,613,130 A | 3/1997 | Teng et al. | |
| 5,639,267 A | 6/1997 | Loudermilk | |
| 5,726,506 A | 3/1998 | Wood | |
| 5,742,513 A | 4/1998 | Bouhenguel et al. | |
| 5,758,102 A | 5/1998 | Carey et al. | |
| 5,775,946 A | 7/1998 | Briones | |
| 5,790,391 A | 8/1998 | Stich et al. | |
| 5,790,873 A | 8/1998 | Popper et al. | |
| 5,793,987 A | 8/1998 | Quackenbush et al. | |

(Continued)

FOREIGN PATENT DOCUMENTS

WO 00/41496 7/2000

OTHER PUBLICATIONS

Berger, A. et al., "Power Ethernet MIB", IETF Standard, Internet Engineering Task Force, pp. 1-20, Dec. 2003.

(Continued)

*Primary Examiner* — John Blanton
(74) *Attorney, Agent, or Firm* — BainwoodHuang

(57) ABSTRACT

A dynamic fuse element is provided in an inline power circuit to provide an electrical current protection level that varies in accordance with allocated current levels and that can respond to current spikes that are not expected. The dynamic fuse element comprises a processor aware of allocated current levels and an inline switch controlled by the processor to turn OFF in the event of a fault. In another aspect ferrite fuses may be provided for relatively low-current applications. In yet another aspect test fuses may be placed on the circuit board to verify that fuses used in manufacture operate at a certain current level.

27 Claims, 12 Drawing Sheets

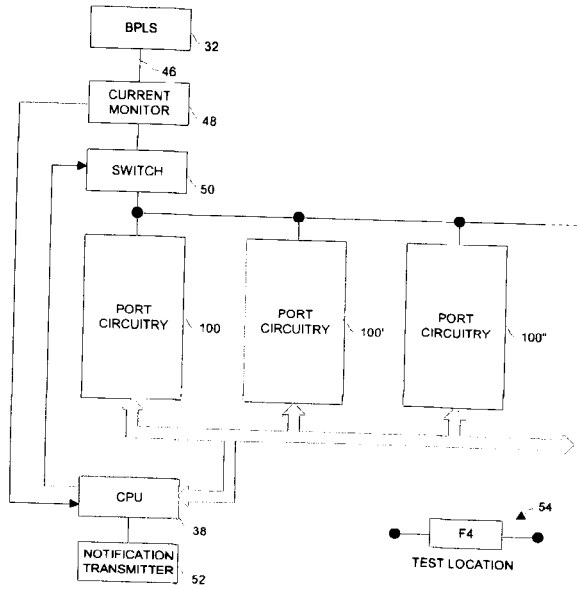

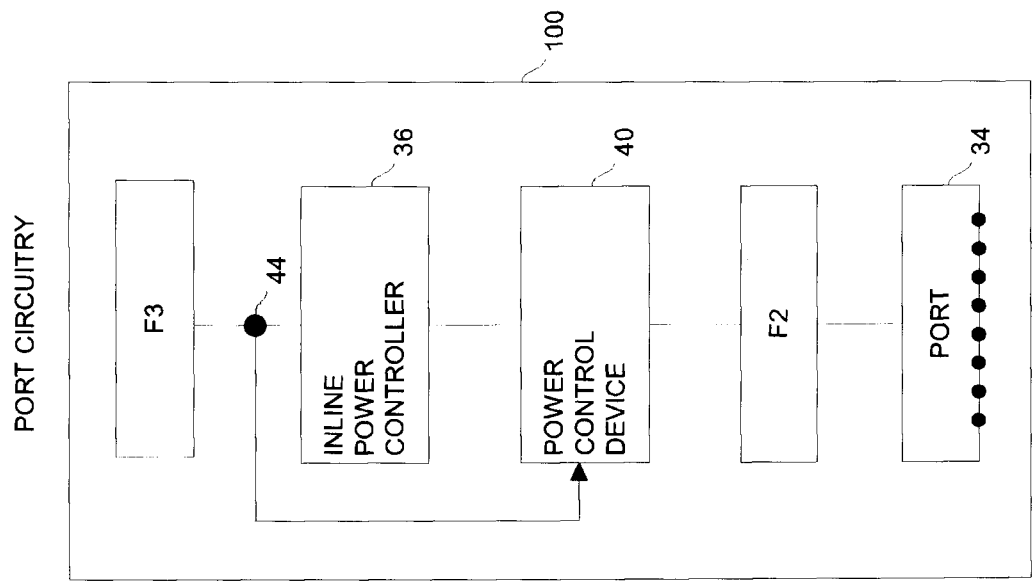

```
┌─────────────────────────────────────────────────────────────┐
│ PROVIDING INLINE POWER FROM A POWER SUPPLY TO AN            │
│ INDIVIDUAL INLINE POWER SUPPLY CIRCUIT POWERING A PORT OF A │──── 110
│ WIRED DATA TELECOMMUNICATIONS DEVICE                        │
└─────────────────────────────────────────────────────────────┘
                                │
┌─────────────────────────────────────────────────────────────┐
│ DISPOSING BETWEEN THE POWER SUPPLY AND THE INDIVIDUAL       │
│ INLINE POWER SUPPLY CIRCUIT ONE OR MORE FERRITE DEVICES     │
│ SELECTED TO HAVE A COMBINED MAXIMUM CURRENT RATING          │
│ APPROXIMATELY THAT OF A DESIRED CURRENT LIMIT OF THE        │
│ INDIVIDUAL INLINE POWER SUPPLY CIRCUIT                      │──── 112
└─────────────────────────────────────────────────────────────┘
```

FIG. 8